US012414192B2

(12) United States Patent
Selvanesan et al.

(10) Patent No.: US 12,414,192 B2
(45) Date of Patent: Sep. 9, 2025

(54) NR SIDELINK DISCONTINUOUS RECEPTION

(71) Applicant: Fraunhofer-Gesellschaft zur Foerderung der angewandten Forschung e.V., Munich (DE)

(72) Inventors: Sarun Selvanesan, Berlin (DE); Baris Goektepe, Berlin (DE); Roya Ebrahim Rezagah, Berlin (DE); Thomas Fehrenbach, Berlin (DE); Thomas Wirth, Berlin (DE); Thomas Schierl, Berlin (DE); Cornelius Hellge, Berlin (DE)

(73) Assignee: Fraunhofer-Gesellschaft zur Foerderung der angewandten Forschung e.V., Munich (DE)

(*) Notice: Subject to any disclaimer, the term of this patent is extended or adjusted under 35 U.S.C. 154(b) by 526 days.

(21) Appl. No.: 17/881,435

(22) Filed: Aug. 4, 2022

(65) Prior Publication Data

US 2023/0062804 A1 Mar. 2, 2023

Related U.S. Application Data

(63) Continuation of application No. PCT/EP2021/052564, filed on Feb. 3, 2021.

(30) Foreign Application Priority Data

Feb. 10, 2020 (EP) .................................... 20156419

(51) Int. Cl.
*H04W 76/00* (2018.01)
*H04W 76/28* (2018.01)

(52) U.S. Cl.
CPC .................................. *H04W 76/28* (2018.02)

(58) Field of Classification Search
None
See application file for complete search history.

(56) References Cited

U.S. PATENT DOCUMENTS 11,184,914 B2 * 11/2021 Guo .................. H04L 69/28
11,849,395 B2 * 12/2023 Thangarasa ............ H04W 4/70
(Continued)

FOREIGN PATENT DOCUMENTS

CN 104871635 A 8/2015
EP 2952052 A1 12/2015

OTHER PUBLICATIONS

LG Electronics Inc et al., Multiple DRX configuration for further power saving, 3GPP Draft; R2-1907664 Multiple DRX Configuration for Further Power Saving,3rd Generation Partnership Project (3GPP), Mobile Competence Centre, 650, Route Des Lucioles, F-06921 Sophia-Antipolis Ced vol. RAN WG2, No. Reno, U.S.A; May 13, 2019-May 17, 2019, May 13, 2019 (May 13, 2019}, XP051731098. 5 pages.

(Continued)

*Primary Examiner* — Gerald A Smarth
(74) *Attorney, Agent, or Firm* — Perkins Coie LLP; Michael A. Glenn

(57) ABSTRACT

A user device, UE, for a wireless communication system is described. The wireless communication system has a plurality of user devices, UEs. The UE communicates with one or more further UEs using a sidelink, SL. To operate in a Discontinuous Reception, DRX, mode, the UE receives a DRX configuration from one of a plurality of DRX configuration sources. The plurality of DRX configuration sources are ranked such that each of the DRX configuration sources has a rank different from the remaining DRX configuration sources, and the UE is to select the DRX configuration from the DRX configuration source having the (Continued)

highest rank among the available DRX configuration sources.

23 Claims, 26 Drawing Sheets

(56) References Cited

U.S. PATENT DOCUMENTS

| | | |
|---|---|---|
| 2014/0112221 A1* | 4/2014 | Verger .............. H04W 52/0216 370/311 |
| 2015/0055532 A1 | 2/2015 | Lu et al. |
| 2017/0041875 A1 | 2/2017 | Lu et al. |
| 2022/0167347 A1 | 5/2022 | Fehrenbach et al. |

OTHER PUBLICATIONS

Huawei et al., Consideration on the sidelink DRX for unicast, groupcast and broadcast, 3GPP Draft; R2-2009413, 3rd Generation Partnership Project (3GPP), Mobile Competence Centre;650, Route Des Lucioles ; F-06921 Sophia-Anti Polis Cedex, France vol. RAN WG2, No. electronic; Nov. 2, 2020-Nov. 13, 2020, Oct. 23, 2020 (Oct. 23, 2020), XP051942371. 8 pages.

Fraunhofer IIS et al., N.R SL DRX, 3GPP Draft; R2-2009993, 3rd Generation Partnership Project (3GPP), Mobile Competence Centre ; 650, Route Des Lucioles;F-06921 Sophia-Anti Polis Cedex, France vol. RAN WG2, Meeting; Nov. 2, 2020-Nov. 13, 2020, Oct. 23, 2020 (Oct. 23, 2020), XP051942744. 4 pages.

\* cited by examiner

DRX-config information element

```
--ASN1START
--TAG-DRX-CONFIG-START

DRX-Config ::=                  SEQUENCE {
    drx-onDurationTimer             CHOICE {
                                        subMilliSeconds    INTEGER (1..31),
                                        milliSeconds       ENUMERATED {
                                            ms1, ms2, ms3, ms4, ms5, ms6, ms8, ms10, ms 20
ms30, ms40, ms50, ms60,
                                            ms80, ms100, ms200, ms300, ms400, ms500,
ms600, ms800, ms1000, ms1200,
                                            ms1600, spare8, spare7, spare6, spare5,
spare4, spare3, spare2, spare1 }
                                        }
                                    },
    drx-InactivityTimer             ENUMERATED {
                                        ms0, ms1, ms2, ms3, ms4, ms5, ms6, ms8, ms10,
ms20, ms30, ms40, ms50, ms60, ms80,
                                        ms100, ms200, ms300, ms500, ms750, ms1280, ms1920,
ms2560, spare9, spare8,
                                        spare7, spare6, spare5, spare4, spare3, spare2,
spare1 },
    drx-HARQ-RTT-TimerDL            INTEGER (0..56),
    drx-HARQ-RTT-TimerUL            INTEGER (0..56),
    drx-RetransmissionTimerDL       ENUMERATED {
                                        s10, s11, s12, s14, s16, s18, s116, s124, s133,
s140, s164, s180, s196, s1112, s1128,
                                        s1160, s1320, spare15, spare14, spare13, spare12,
spare11, spare10, spare9,
                                        spare8, spare7, spare6, spare5, spare4, spare3,
spare2, spare1),
    drx-RetransmissionTimerUL       ENUMERATED {
                                        s10, s11, s12, s14, s16, s18, s116, s124, s133,
s140, s164, s180, s196, s1112, s1128,
                                        s1160, s1320, spare15, spare14, spare13, spare12,
spare11, spare10, spare9,
                                        spare8, spare7, spare6, spare5, spare4, spare3,
spare2, spare1),
    drx-LongCycleStartOffset        CHOICE {
        ms10                            INTEGER (0..9),
        ms20                            INTEGER (0..19),
        ms32                            INTEGER (0..31),
        ms40                            INTEGER (0..39),
        ms60                            INTEGER (0..59),
        ms64                            INTEGER (0..63),
        ms70                            INTEGER (0..69),
        ms80                            INTEGER (0..79),
        ms128                           INTEGER (0..127),
        ms160                           INTEGER (0..159),
        ms256                           INTEGER (0..255),
        ms320                           INTEGER (0..319),
        ms512                           INTEGER (0..511),
        ms640                           INTEGER (0..639),
        ms1024                          INTEGER (0..1023),
        ms1280                          INTEGER (0..1279),
        ms2048                          INTEGER (0..2047),
        ms2560                          INTEGER (0..2559),
        ms5120                          INTEGER (0..5119),
        ms10240                         INTEGER (0..10239),
    },
    shortDRX                        SEQUENCE {
        drx-ShortCycle                  ENUMERATED {
                                            ms2, ms3, ms4, ms5, ms6, ms7, ms8, ms10, ms14,
ms16, ms20, ms30, ms32,
                                            ms35, ms40, ms64, ms80, ms128, ms160, ms256,
ms320, ms512, ms640, spare9,
                                            spare8, spare7, spare6, spare5, spare4,
spare3, spare2, spare1, },
        drx-ShortCycleTimer             INTEGER (0..16),
    }
OPTIONAL,  --Need R
    drx-SlotOffset                  INTEGER (0..31)
}

--TAG-DRX-CONFIG-STOP
--ASN1STOP
```

Fig. 4(a)

| DRX-config field descriptions |
|---|
| drx-HARQ-RTT-TimerDL<br>Value in number of symbols of the BWP where the transport block was received. |
| drx-HARQ-RTT-TimerUL<br>Value in number of symbols of the BWP where the transport block was transmitted. |
| drx-InactivityTimer<br>Value in multiple integers of 1 ms. ms0 corresponds to 0, ms1 corresponds to 1 ms, ms2 corresponds to 2 ms, and so on. |
| drx-LongCycleStartOffset<br>drx-LongCycle in ms and drx-StartOffset in multiples of 1ms. If drx-ShortCycle is configured, the value of drx-LongCycle shall be a multiple of the drx-ShortCycle value. |
| drx-onDurationTimer<br>Value in multiples of 1/32 ms (subMilliSeconds) or in ms (milliSecond). For the latter, value ms1 corresponds to 1ms, value ms2 corresponds to 2 ms, and so on. |
| drx-RetransmissionTimerDL<br>Value in number of slot lengths of the BWP where the transport block was received. value s/0 corresponds to 0 slots, s/1 corresponds to 1 slot, s/2 corresponds to 2 slots, and so on. |
| drx-RetransmissionTimerUL<br>Value in number of slot lengths of the BWP where the transport block was transmitted. s/0 corresponds to 0 slots, s/1 corresponds to 1 slot, s/2 corresponds to 2 slots, and so on. |
| drx-ShortCycleTimer<br>Value in multiples of drx-ShortCycle. A value of 1 corresponds to drx-ShortCycle, a value of 2 corresponds to 2 *drx-ShortCycle and so on. |
| drx-ShortCycle<br>Value in ms. ms1 corresponds to 1 ms, ms2 corresponds to 2 ms, and so on. |
| drx-SlotOffset<br>Value in 1/32 ms. Value 0 corresponds to 0 ms, value 1 corresponds to 1/32 ms, value 2 corresponds to 2/32 ms, and so on. |

Fig. 4(b)

| UEAssistanceInformation field descriptions |
|---|
| ~~delayBudgetReport~~<br>~~Indicates the UE-preferred adjustment to connected mode DRX.~~ |
| reducedBW-FR1-DL<br>Indicates the UE's preference on reduced configuration corresponding to the maximum aggregated bandwidth across all downlink carrier(s) of FR1 indicated by the field, to address overheating. This field is allowed to be reported only when UE is configured with serving cell(s) operating on FR1. This maximum aggregated bandwidth includes downlink carrier(s) of FR1 of both the MCG and the SCG. Value mhz0 is not used. The aggregated bandwidth across all downlink carrier(s) of FR1 is the sum of bandwidth of active downlink BWP(s) across all activated downlink carrier(s) of FR1. |
| reducedBW-FR1-UL<br>Indicates the UE's preference on reduced configuration corresponding to the maximum aggregated bandwidth across all uplink carrier(s) of FR1 indicated by the field, to address overheating. This field is allowed to be reported only when UE is configured with serving cell(s) operating on FR1. This maximum aggregated bandwidth includes uplink carrier(s) of FR1 of both the MCG and the SCG. Value mhz0 is not used. The aggregated bandwidth across all uplink carrier(s) of FR1 is the sum of bandwidth of active uplink BWP(s) across all activated uplink carrier(s) of FR1. |
| reducedBW-FR2-DL<br>Indicates the UE's preference on reduced configuration corresponding to the maximum aggregated bandwidth across all downlink carrier(s) of FR2 indicated by the field, to address overheating. This field is allowed to be reported only when UE is configured with serving cell(s) operating on FR2. This maximum aggregated bandwidth includes downlink carrier(s) of FR2 of both the MCG and the NR SCG. The aggregated bandwidth across all downlink carrier(s) of FR2 is the sum of bandwidth of active downlink BWP(s) across all activated downlink carrier(s) of FR2. |
| reducedBW-FR2-UL<br>Indicates the UE's preference on reduced configuration corresponding to the maximum aggregated bandwidth across all uplink carrier(s) of FR2 indicated by the field, to address overheating. This field is allowed to be reported only when UE is configured with serving cell(s) operating on FR2. This maximum aggregated bandwidth includes uplink carrier(s) of FR2 of both the MCG and the NR SCG. The aggregated bandwidth across all upink carrier(s) of FR2 is the sum of bandwidth of active uplink BWP(s) across all activated uplink carrier(s) of FR2. |
| reducedCCsDL<br>Indicates the UE's preference on reduced configuration corresponing to the maximum number of downlink SCells indicated by the field, to address overheating. This maximum number includes both SCells of the MCG and PSCell/SCells of the SCG. |
| reducedCCsUL<br>Indicates the UE's preference on reduced configuration corresponing to the maximum number of uplink SCells indicated by the field, to address overheating. This maximum number includes both SCells of the MCG and PSCell/SCells of the SCG. |

Fig. 5(a) (Part 1)

reducedMIMO-LayersFR1-DL
Indicates the UE's preference on reduced configuration corresponing to the maximum number of downlink MIMO layers of each serving cell operating on FR1 indicated by the field, to address overheating. This field is allowed to be reported only when UE is configured with serving cells operating on FR1.

reducedMIMO-LayersFR1-UL
Indicates the UE's preference on reduced configuration corresponing to the maximum number of uplink MIMO layers of each serving cell operating on FR1 indicated by the field, to address overheating. This field is allowed to be reported only when UE is configured with serving cells operating on FR1.

reducedMIMO-LayersFR2-DL
Indicates the UE's preference on reduced configuration corresponing to the maximum number of downlink MIMO layers of each serving cell operating on FR2 indicated by the field, to address overheating. This field is allowed to be reported only when UE is configured with serving cells operating on FR2.

reducedMIMO-LayersFR2-UL
Indicates the UE's preference on reduced configuration corresponing to the maximum number of uplink MIMO layers of each serving cell operating on FR2 indicated by the field, to address overheating. This field is allowed to be reported only when UE is configured with serving cells operating on FR2 .

type1
Indicates the preferred amount of increment/decrement to the long DRX cycle length with respect to the current configuration. Value in number of milliseconds. Value ms40 corresponds to 40 milliseconds, msMinus40 corresponds to -40 milliseconds and so on.

Fig. 5(a) (Part 2)

```
DelayBudgetReport::=
    type1
        msMinus160, msMinus80, msMinus60, msMinus40,
        ms320, ms640, ms1280 },
    CHOICE {
        ENUMERATED {
            msMinus1280, msMinus640, msMinus320,
            msMinus20, ms0, ms20, ms40, ms60, ms80, ms160,
    ...
}
```

Fig. 5(b)

SL-DRX-Config information element

```
--ASN1START
--TAG-DRX-CONFIG-START

SL-DRX-Config : : =                SEQUENCE {
    sl-drx-onDurationTimer             CHOICE {
                                           subMilliSeconds INTEGER (1..31),
                                           milliSeconds    ENUMERATED {
                                              ms1, ms2, ms3, ms4, ms5, ms6, ms8, ms10, ms20,
ms30, ms40, ms50, ms60,
                                              ms80, ms100, ms200, ms300, ms400, ms500,
ms600, ms800, ms1000, ms1200,
                                              ms1600, spare8, spare8, spare7, spare6, spare5,
spare4, spare3, spare2, spare1 }
                                           },
    sl-drx-InactivtyTimer              ENUMERATED {
                                           ms0, ms1, ms2, ms3, ms4, ms5, ms6, ms8, ms10,
ms20, ms30, ms40, ms50, ms60, ms80,
                                           ms100, ms200, ms300, ms500, ms750, ms1280, ms1920,
ms2560, spare9, spare8,
                                           spare7, spare6, spare5, spare4, spare3, spare2,
spare1 },
    sl-drx-HARQ-RTT-Timer              INTEGER (0..56),
    sl-drx-RetransmissionTimer         ENUMERATED {
                                           s10, s11, s12, s14, s16, s18, s116, s124, s133,
s140, s164, s180, s196, s1112, s1128,
                                           s1160, s1320, spare15, spare14, spare13, spare12,
spare11, spare10, spare9,
                                           spare8, spare7, spare6, spare5, spare4, spare3,
spare2, spare1, },
    sl-drx-LongCycleStartOffset        CHOICE {
        ms10                               INTEGER(0..9),
        ms20                               INTEGER(0..19),
        ms32                               INTEGER(0..31),
        ms40                               INTEGER(0..39),
        ms60                               INTEGER(0..59),
        ms64                               INTEGER(0..63),
        ms70                               INTEGER(0..69),
        ms80                               INTEGER(0..79),
        ms128                              INTEGER(0..127),
        ms160                              INTEGER(0..159),
        ms256                              INTEGER(0..255),
        ms320                              INTEGER(0..319),
        ms512                              INTEGER(0..511),
        ms640                              INTEGER(0..639),
        ms1024                             INTEGER(0..1023),
        ms1280                             INTEGER(0..1279),
        ms2048                             INTEGER(0..2047),
        ms2560                             INTEGER(0..2559),
        ms5120                             INTEGER(0..5119),
        ms10240                            INTEGER(0..10239),
    },
SL-shortDRX                         SEQUENCE {
    sl-drx-ShortCycle                  ENUMERATED {
                                           ms2, ms3, ms4, ms5, ms6, ms7, ms8, ms10, ms14,
ms16, ms20, ms30, ms32,
                                           ms35, ms40, ms64, ms80, ms128, ms160,ms256,
ms320, ms152, ms640, spare9,
                                           spare8, spare7, spare6, spare5, spare4,
spare3, spare2, spare1, },
    sl-drx-ShortCycleTimer             INTEGER (1..16)
OPTIONAL,   --Need R
    Sl-drx-SlotOffset              INTEGER (0..31)
}
--TAG-DRX-CONGIG STOP
--ASN1STOP
```

Fig. 19(a)

| DRX-Config field descriptions |
|---|
| sl-drx-HARQ-RTT-Timer<br>Value in number of symbols of the BWP where the transport block was transmitted or received in SL. |
| sl-drx-InactivityTimer<br>Value in multiple integers of 1 ms. ms0 corresponds to 0, ms1 corresponds to 1 ms, ms2 corresponds to 2 ms, and so on. |
| sl-drx-LongCycleStartOffset<br>sl-drx-LongCycle in ms and sl-drx-StartOffset in multiples of 1 ms. If sl-drx-ShortCycle is configured, the value of sl-drx-LongCycle shall be a multiple of the sl-drx-ShortCycle value. |
| sl-drx-onDurationTimer<br>Value in multiples of 1/32 ms (subMilliSeconds) or in ms (milliSecond). For the latter, value ms1 corresponds to 1 ms, value ms2 corresponds to 2 ms, and so on. |
| sl-drx-RetransmissionTimer<br>Value in number of slot lengths of the BWP where the transport block was transmitted or received. value sl0 corresponds to 0 slots, sl1 corresponds to 1 slot, s/2 corresponds to 2 slots, and so on. |
| sl-drx-ShortCycleTimer<br>Value in multiples of sl-drx-ShortCycle. A value of 1 corresponds to sl-drx-ShortCycle, a value of 2 corresponds to 2*sl-drx-ShortCycle ans so on. |
| sl-drx-ShortCycle<br>Value in ms. ms1 corresponds to 1 ms, ms2 corresponds to 2 ms, and so on. |
| sl-drx-SlotOffset<br>Value in 1/32 ms. Value 0 corresponds to 0 ms, value 1 corresponds to 1/32 ms, value 2 corresponds to 2/32 ms, and so on. |

Fig. 19(b)

| UEAssistanceInformation field descriptions |
| --- |
| SL-delayBudgetReport<br>Indicates the UE-preferred adjustment to connected mode DRX. |
| sl-type1-a<br>Indicates the preferred amount of increment/decrement to the long DRX cycle length with respect to the current configuration. Value in number of milliseconds. Value ms40 corresponds to 40 milliseconds, msMinus40 corresponds to -40 milliseconds and so on. |
| sl-type1-b<br>Indicates the preferred amount of increment/decrement to the short DRX cycle length with respect to the current configuration. Value in 1/32 milliseconds. Value 0 corresponds to -31/32 milliseconds, value 1 corresponds to -30/32 milliseconds, value 32 corresponds to 0 milliseconds, value 33 correspondes to 1/32 milliseconds, value 34 corresponds to 2/32 milliseconds, and so on. |
| sl-type2<br>Indicates the preferred amount of offset for the DRX cycle with respect to the current configuration. Value in milliseconds. Value msMinus40 corresponds to -40 milliseconds and so on. |
| sl-type3<br>Indicates the preferred amount of increment/decrement to the sl-drx-onDurationTimer with respect to the current configuration. Value in 1/32 milliseconds. Value 0 corresponds to -16/32 milliseconds, value 1 corresponds to -15/32 milliseconds, value 16 corresponds to 0 milliseconds, value 17 correspondes to 1/32 millisecond, value 18 corresponds to 2/32 milliseconds, and so on. |

Fig. 24(a)

```
SL-DelayBudgetReport ::=     CHOICE {
    sl-type1-a               ENUMERATED {
                                 msMinus1280, msMinus640, msMinus320,
msMinus160, msMinus80, msMinus60, msMinus40,
                                 msMinus20, ms0, ms20, ms40, ms60, ms80, ms160,
ms320, ms640, ms1280 },
    sl-type1-b               INTEGER (0..62),
    sl-type2                 ENUMERATED {
                                 msMinus1280, msMinus640, msMinus320,
msMinus160, msMinus80, msMinus60, msMinus40, msMinus20, ms0 },
    ...
    sl-type3                 INTEGER (0..33),
}
```

Fig. 24(b)

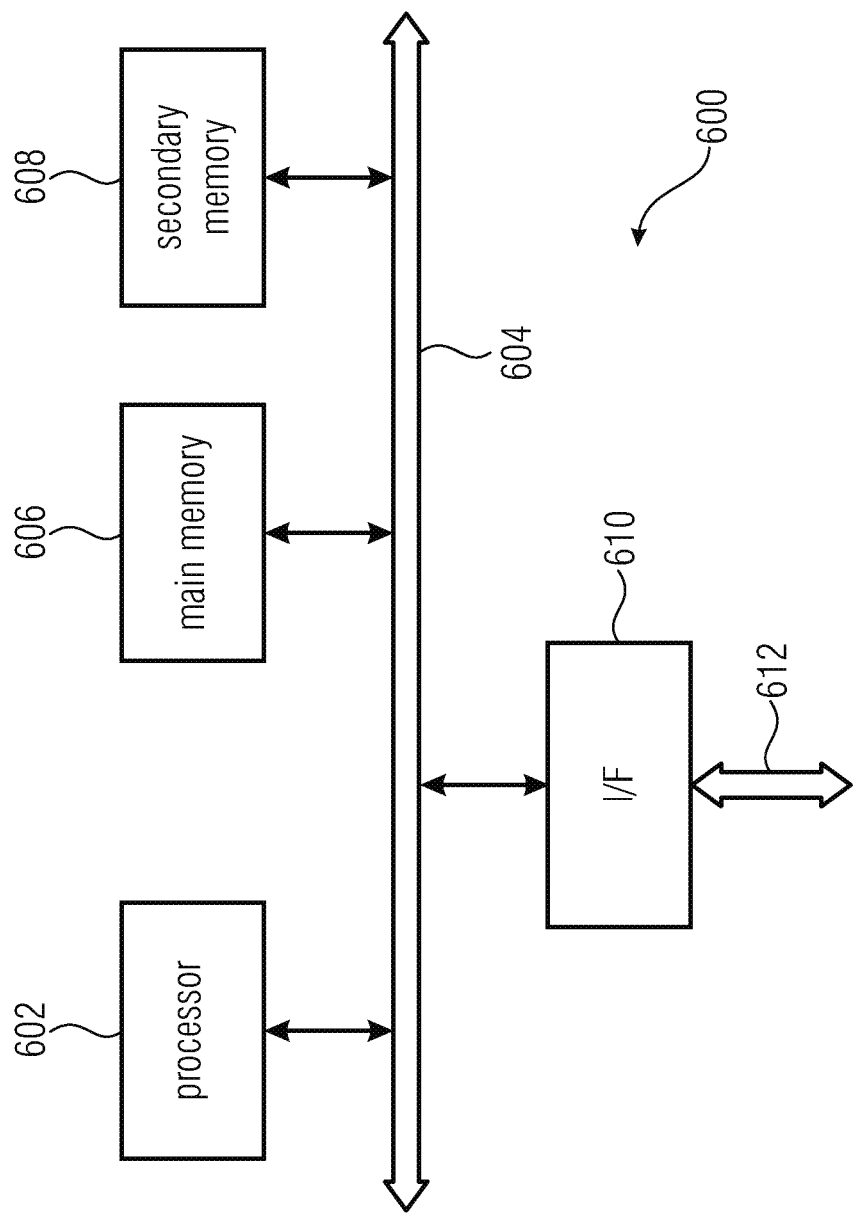

NR SIDELINK DISCONTINUOUS RECEPTION

CROSS-REFERENCE TO RELATED APPLICATIONS

This application is a continuation of copending International Application No. PCT/EP2021/052564, file Feb. 3, 2021, which is incorporated herein by reference in its entirety, and additionally claims priority from European Application No. 20156419.2, filed Feb. 10, 2020, which is also incorporated herein by reference in its entirety.

TECHNICAL FIELD

The present application relates to the field of wireless communication systems or networks, more specifically to enhancements or improvements regarding discontinuous reception, DRX on a sidelink, SL. Embodiments of the present invention concern the NR SL DRX configuration or synchronization source selection, the NR SL DRX cycle length, the NR SL DRX alignment, the content of a ON duration of the NR SL DRX, the NR SL DRX signaling procedure, and the use of resources for the ON duration by other user devices.

BACKGROUND OF THE INVENTION

FIG. 1 is a schematic representation of an example of a terrestrial wireless network 100 including, as is shown in FIG. 1(a), a core network 102 and one or more radio access networks $RAN_1$, $RAN_2$, ... . $RAN_N$. FIG. 1(b) is a schematic representation of an example of a radio access network $RAN_n$ that may include one or more base stations $gNB_1$ to $gNB_5$, each serving a specific area surrounding the base station schematically represented by respective cells $106_1$ to $106_5$. The base stations are provided to serve users within a cell. The one or more base stations may serve users in licensed and/or unlicensed bands. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enables these devices to collect and exchange data across an existing network infrastructure. FIG. 1(b) shows an exemplary view of five cells, however, the $RAN_n$ may include more or less such cells, and $RAN_n$ may also include only one base station. FIG. 1(b) shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. This may be realized on licensed bands or on unlicensed bands. Further, FIG. 1(b) shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1(b) by the arrows pointing to "core". The core network 102 may be connected to one or more external networks. Further, some or all of the respective base station $gNB_1$ to $gNB_5$ may be connected, e.g. via the S1 or X2 interface or the XN interface in NR, with each other via respective backhaul links $116_1$ to $116_5$, which are schematically represented in FIG. 1(b) by the arrows pointing to "gNBs". A sidelink channel allows direct communication between UEs, also referred to as device-to-device (D2D) communication. The sidelink interface in 3GPP is named PC5.

For data transmission a physical resource grid may be used. The physical resource grid may comprise a set of resource elements to which various physical channels and physical signals are mapped. For example, the physical channels may include the physical downlink, uplink and sidelink shared channels (PDSCH, PUSCH, PSSCH) carrying user specific data, also referred to as downlink, uplink and sidelink payload data, the physical broadcast channel (PBCH) carrying for example a master information block (MIB) and one or more of a system information block (SIB), the physical downlink, uplink and sidelink control channels (PDCCH, PUCCH, PSSCH) carrying for example the downlink control information (DCI), the uplink control information (UCI) and the sidelink control information (SCI). Note, the sidelink interface may a support 2-stage SCI. This refers to a first control region containing some parts of the SCI, and optionally, a second control region, which contains a second part of control information.

For the uplink, the physical channels may further include the physical random access channel (PRACH or RACH) used by UEs for accessing the network once a UE synchronized and obtained the MIB and SIB. The physical signals may comprise reference signals or symbols (RS), synchronization signals and the like. The resource grid may comprise a frame or radio frame having a certain duration in the time domain and having a given bandwidth in the frequency domain. The frame may have a certain number of subframes of a predefined length, e.g. 1 ms. Each subframe may include one or more slots of 12 or 14 OFDM symbols depending on the cyclic prefix (CP) length. A frame may also consist of a smaller number of OFDM symbols, e.g. when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard, or the 5G or NR, New Radio, standard, or the NR-U, New Radio Unlicensed, standard.

The wireless network or communication system depicted in FIG. 1 may be a heterogeneous network having distinct overlaid networks, e.g., a network of macro cells with each macro cell including a macro base station, like base station $gNB_1$ to $gNB_5$, and a network of small cell base stations (not shown in FIG. 1), like femto or pico base stations. In addition to the above described terrestrial wireless network also non-terrestrial wireless communication networks (NTN) exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-Advanced Pro standard or the 5G or NR, new radio, standard.

In mobile communication networks, for example in a network like that described above with reference to FIG. 1, like an LTE or 5G/NR network, there may be UEs that communicate directly with each other over one or more sidelink (SL) channels, e.g., using the $PC_5$ interface. UEs that communicate directly with each other over the sidelink may include vehicles communicating directly with other vehicles (V2V communication), vehicles communicating with other entities of the wireless communication network (V2X communication), for example roadside entities, like traffic lights, traffic signs, or pedestrians. Other UEs may not be vehicular related UEs and may comprise any of the above-mentioned devices. Such devices may also communicate directly with each other (D2D communication) using the SL channels.

When considering two UEs directly communicating with each other over the sidelink, both UEs may be served by the same base station so that the base station may provide sidelink resource allocation configuration or assistance for the UEs. For example, both UEs may be within the coverage area of a base station, like one of the base stations depicted in FIG. 1. This is referred to as an "in-coverage" scenario. Another scenario is referred to as an "out-of-coverage" scenario. It is noted that "out-of-coverage" does not mean that the two UEs are not within one of the cells depicted in FIG. 1, rather, it means that these UEs

- may not be connected to a base station, for example, they are not in an RRC connected state, so that the UEs do not receive from the base station any sidelink resource allocation configuration or assistance, and/or
- may be connected to the base station, but, for one or more reasons, the base station may not provide sidelink resource allocation configuration or assistance for the UEs, and/or
- may be connected to the base station that may not support NR V2X services, e.g. GSM, UMTS, LTE base stations.

When considering two UEs directly communicating with each other over the sidelink, e.g. using the PC5 interface, one of the UEs may also be connected with a BS, and may relay information from the BS to the other UE via the sidelink interface. The relaying may be performed in the same frequency band (in-band-relay) or another frequency band (out-of-band relay) may be used. In the first case, communication on the Uu and on the sidelink may be decoupled using different time slots as in time division duplex, TDD, systems.

FIG. 2 is a schematic representation of an in-coverage scenario in which two UEs directly communicating with each other are both connected to a base station. The base station gNB has a coverage area that is schematically represented by the circle 200 which, basically, corresponds to the cell schematically represented in FIG. 1. The UEs directly communicating with each other include a first vehicle 202 and a second vehicle 204 both in the coverage area 200 of the base station gNB. Both vehicles 202, 204 are connected to the base station gNB and, in addition, they are connected directly with each other over the PC5 interface. The scheduling and/or interference management of the V2V traffic is assisted by the gNB via control signaling over the Uu interface, which is the radio interface between the base station and the UEs. In other words, the gNB provides SL resource allocation configuration or assistance for the UEs, and the gNB assigns the resources to be used for the V2V communication over the sidelink. This configuration is also referred to as a mode 1 configuration in NR V2X or as a mode 3 configuration in LTE V2X.

FIG. 3 is a schematic representation of an out-of-coverage scenario in which the UEs directly communicating with each other are either not connected to a base station, although they may be physically within a cell of a wireless communication network, or some or all of the UEs directly communicating with each other are to a base station but the base station does not provide for the SL resource allocation configuration or assistance. Three vehicles 206, 208 and 210 are shown directly communicating with each other over a sidelink, e.g., using the PC5 interface. The scheduling and/or interference management of the V2V traffic is based on algorithms implemented between the vehicles. This configuration is also referred to as a mode 2 configuration in NR V2X or as a mode 4 configuration in LTE V2X. As mentioned above, the scenario in FIG. 3 which is the out-of-coverage scenario does not necessarily mean that the respective mode 2 UEs (in NR) or mode 4 UEs (in LTE) are outside of the coverage 200 of a base station, rather, it means that the respective mode 2 UEs (in NR) or mode 4 UEs (in LTE) are not served by a base station, are not connected to the base station of the coverage area, or are connected to the base station but receive no SL resource allocation configuration or assistance from the base station. Thus, there may be situations in which, within the coverage area 200 shown in FIG. 2, in addition to the NR mode 1 or LTE mode 3 UEs 202, 204 also NR mode 2 or LTE mode 4 UEs 206, 208, 210 are present.

In the above-described scenarios of vehicular user devices, UEs, a plurality of such user devices may form a user device group, also referred to simply as group, and the communication within the group or among the group members may be performed via the sidelink interfaces between the user devices, like the PC5 interface. For example, the above-described scenarios using vehicular user devices may be employed in the field of the transport industry in which a plurality of vehicles being equipped with vehicular user devices may be grouped together, for example, by a remote driving application. Other use cases in which a plurality of user devices may be grouped together for a sidelink communication among each other include, for example, factory automation and electrical power distribution. In the case of factory automation, a plurality of mobile or stationary machines within a factory may be equipped with user devices and grouped together for a sidelink communication, for example for controlling the operation of the machine, like a motion control of a robot. In the case of electrical power distribution, entities within the power distribution grid may be equipped with respective user devices which, within a certain area of the system may be grouped together so as to communicate via a sidelink communication with each other so as to allow for monitoring the system and for dealing with power distribution grid failures and outages.

Naturally, in the above-mentioned use cases sidelink communication is not limited to a communication within a group. Rather, the sidelink communication may be among any of UEs, like any pair of UEs.

It is noted that the information in the above section is only for enhancing the understanding of the background of the invention and therefore it may contain information that does not form known technology that is already known to a person of ordinary skill in the art.

Starting from the known technology as described above, there may be a need for enhancements or improvements regarding discontinuous reception, DRX, on a sidelink, SL.

SUMMARY

An embodiment may have a user device, UE, for a wireless communication system, the wireless communication system including a plurality of user devices, UEs, wherein the UE is to communicate with one or more further UEs using a sidelink, SL, wherein, to operate in a Discontinuous Reception, DRX, mode, the UE is to receive a DRX configuration from one of a plurality of DRX configuration sources, and wherein the plurality of DRX configuration sources are ranked such that each of the DRX configuration sources has a rank different from the remaining DRX configuration sources, and the UE is to select the DRX configuration from the DRX configuration source having the highest rank among the available DRX configuration sources.

Another embodiment may have a user device, UE, for a wireless communication system, the wireless communication system including a plurality of user devices, UEs, wherein the UE is to communicate with one or more further UEs using a sidelink, SL, wherein the UE is to operate in a Discontinuous Reception, DRX, mode in accordance with a DRX configuration including one or more DRX patterns defining a fixed length DRX cycle or an adaptive length DRX cycle for a time period the DRX configuration is valid, and wherein, in case of a fixed length DRX cycle, an overall duration of a DRX cycle and the ON-OFF durations of the DRX cycle are fixed, and, in case of an adaptive length DRX cycle, an overall duration of a DRX cycle and/or the ON-OFF durations of the DRX cycle is adapted dependent on one or more parameters, e.g., parameters associated with the UE and/or the environment in which the UE is located.

Another embodiment may have a user device, UE, for a wireless communication system, the wireless communication system including a plurality of user devices, UEs, wherein the UE is to communicate with one or more further UEs using a sidelink, SL, wherein the UE is to operate in a Discontinuous Reception, DRX, mode, and wherein the UE is to align the DRX cycles with an access point, like a base station, gNB, or a gateway node, of the wireless communication system and/or one or more of the further UEs.

Another embodiment may have a user device, UE, for a wireless communication system, the wireless communication system including a plurality of user devices, UEs, wherein the UE is to communicate with one or more further UEs using a sidelink, SL, wherein the UE is to operate in a Discontinuous Reception, DRX, mode, and wherein an ON duration of a DRX cycle depends on a certain purpose for which the UE is to use the ON duration.

Another embodiment may have a user device, UE, for a wireless communication system, the wireless communication system including a plurality of user devices, UEs, wherein the UE is to communicate with one or more further UEs using a sidelink, SL, wherein, to operate in a Discontinuous Reception, DRX, mode, the UE is to receive one or more DRX configurations from a DRX synchronization source, and wherein the DRX synchronization source includes a base station, the UE is to receive from the base station a control message, e.g. SIB, including the one or more DRX configurations, or the DRX synchronization source includes one or more of the further UEs, the UE is to receive the one or more DRX configurations from a further UE using, e.g., a PC5 RRC signaling or a SCI for a given transmission.

Another embodiment may have a user device, UE, for a wireless communication system, the wireless communication system including a plurality of user devices, UEs, wherein the UE is to communicate with one or more further UEs using a sidelink, SL, wherein the UE does not operate in a Discontinuous Reception, DRX, mode but is aware of one or more of the further UEs operating in the DRX mode, and wherein the UE is to avoid resources for a transmission that are used by a further UE during its ON duration.

Another embodiment may have a wireless communication system, having a plurality of any of the above inventive user devices, UEs, and configured for a sidelink communication using, for example resources from a set of sidelink resources of the wireless communication system.

According to another embodiment, a method for operating a user device, UE, of a wireless communication system in a Discontinuous Reception, DRX, mode, the wireless communication system including a plurality of user devices, UEs, and the UE communicating with one or more further UEs using a sidelink, SL, may have the step of: receiving, by the UE, a DRX configuration from one of a plurality of DRX configuration sources, wherein the plurality of DRX configuration sources are ranked such that each of the DRX configuration sources has a rank different from the remaining DRX configuration sources, and the UE is to select the DRX configuration from the DRX configuration source having the highest rank among the available DRX configuration sources.

According to still another embodiment, a method for operating a user device, UE, of a wireless communication system, the wireless communication system including a plurality of user devices, UEs, and the UE communicating with one or more further UEs using a sidelink, SL, may have the step of: operating the UE in a Discontinuous Reception, DRX, mode in accordance with a DRX configuration including one or more DRX patterns defining a fixed length DRX cycle or an adaptive length DRX cycle for a time period the DRX configuration is valid, wherein, in case of a fixed length DRX cycle, an overall duration of a DRX cycle and the ON-OFF durations of the DRX cycle are fixed, and, in case of an adaptive length DRX cycle, an overall duration of a DRX cycle and/or the ON-OFF durations of the DRX cycle is adapted dependent on one or more parameters, e.g., parameters associated with the UE and/or the environment in which the UE is located.

According to another embodiment, a method for operating a user device, UE, of a wireless communication system in a Discontinuous Reception, DRX, mode, the wireless communication system including a plurality of user devices, UEs, and the UE communicating with one or more further UEs using a sidelink, SL, may have the step of: aligning, by the UE, the DRX cycles of the UE with an access point, like a base station, gNB, or a gateway node, of the wireless communication system and/or one or more of the further UEs.

According to another embodiment, a method for operating a user device, UE, of a wireless communication system in a Discontinuous Reception, DRX, mode, the wireless communication system including a plurality of user devices, UEs, and the UE communicating with one or more further UEs using a sidelink, SL, may have the step of: setting, by the UE, an ON duration of a DRX cycle dependent on a certain purpose for which the UE is to use the ON duration.

According to another embodiment, a method for operating a user device, UE, for a wireless communication system in a Discontinuous Reception, DRX, mode, the wireless communication system including a plurality of user devices, UEs, and the UE communicating with one or more further UEs using a sidelink, SL, may have the step of: receiving, by the UE, one or more DRX configurations from a DRX synchronization source, wherein
  when the DRX synchronization source includes a base station, receiving, by the UE, from the base station a control message, e.g. SIB, including the one or more DRX configurations, or
  when the DRX synchronization source includes one or more of the further UEs, receiving, by the UE, the one or more DRX configurations from a further UE using, e.g., a PC5 RRC signaling or a SCI for a given transmission.

According to another embodiment, a method for operating a user device, UE, for a wireless communication system, the wireless communication system including a plurality of user devices, UEs, and the UE communicating with one or more further UEs using a sidelink, SL, not operating in a Discontinuous Reception, DRX, mode but being aware of one or more of the further UEs operating in the DRX mode, may have the step of: avoiding, by the UE, resources for a transmission that are used by a further UE during its ON duration.

Still another embodiment may have a non-transitory digital storage medium having stored thereon a computer program for performing any of the above inventive methods, when said computer program is run by a computer.

BRIEF DESCRIPTION OF THE DRAWINGS

Embodiments of the present invention are now described in further detail with reference to the accompanying drawings:

FIG. 4(a) illustrates an example of a DRX-config information element, IE,

FIG. 4(b) is a table including the DRX-config field descriptions of the DRX-config IE in FIG. 4(a);

FIG. 5(a) illustrates an example of assistance information that may be provided or transmitted by a UE;

FIG. 5(b) illustrates a delay budget report information element, IE, transmitted by a UE as part of the assistance information;

FIG. 19(a) illustrates a sidelink DRX configuration element;

FIG. 19(b) includes a table including a description of the fields of the SL DRX configuration information element of FIG. 19(a);

FIG. 24(a) an assistance information IE in accordance with an embodiment of the fifth aspect of the present invention;

FIG. 24(b) illustrates a delay budget report information element, IE, transmitted by a UE as part of the assistance information;

FIG. 26 illustrates an example of a computer system on which units or modules as well as the steps of the methods described in accordance with the inventive approach may execute.

DETAILED DESCRIPTION OF THE INVENTION

Figure 1A:
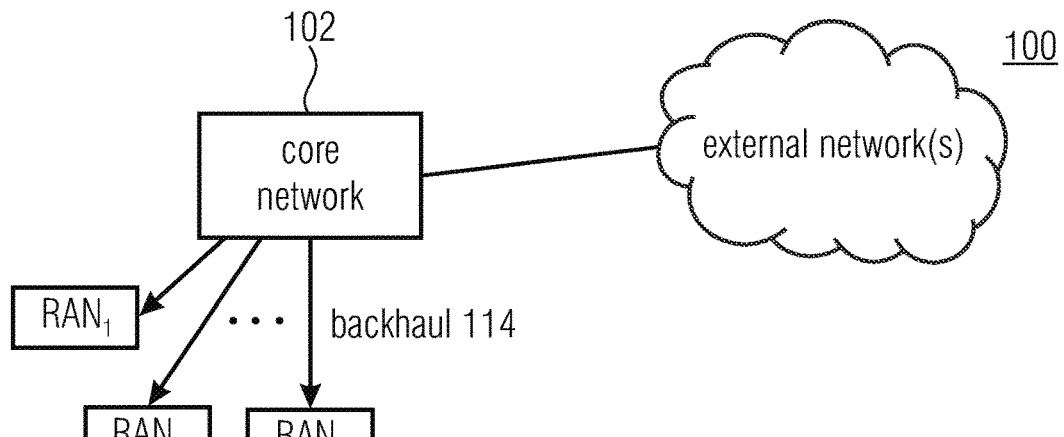
FIG. 1a-b shows a schematic representation of an example of a wireless communication system.

Embodiments of the present invention are now described in more detail with reference to the accompanying drawings in which the same or similar elements have the same reference signs assigned.

In the wireless communication system or network, like the one described above with reference to FIG. 1, FIG. 2 or FIG. 3, a sidelink communication among the respective user devices may be implemented, for example, a vehicle-to-vehicle communication, V2V, a vehicle-to-anything communication, or any device-to-device, D2D, communication among any other use devices, for example, those mentioned above. However, in a NR-Uu operation or in a sidelink operation, like a PC5 operation, the UE is awake at all times and monitors the control channel in every subframe in order to be able to receive from the network and from another UE, respectively. This increases the power consumption at the UE, since the UE is always on, even when there is no data to be transmitted or received. For vehicular use cases, like NR V2X, power saving is not a concern since the vehicular UEs, V-UEs, are devices with a sufficient power source, e.g., an onboard battery of the vehicle.

However, the sidelink communication or the sidelink PC5 operation is not limited to the operation of vehicular UEs, but other UEs with a limited or finite power supply, like regular user devices including a battery that needs to be recharged regularly, may communicate over the sidelink. Such UEs may include so-called vulnerable road users, VUEs, like a pedestrian UE, P-UE, or first responder devices for public safety use cases, or IoT devices, like general IoT UEs or industrial IoT UEs. For these types of UEs, since they are not connected to a constant power supply but rely on their battery, power saving is important.

To reduce the power consumption at a UE in NR, the discontinuous reception, DRX, is employed on the Uu interface. DRX is a mechanism where the UE goes into a sleep mode for a certain period of time, during which it does not transmit or receive any data. The UE wakes for another period of time, where it may transmit and receive data. One the key aspects of DRX is the synchronization between the UE and the network in terms of its wake-up and sleep cycles, also referred to as the DRX cycles. In a worst-case scenario, the network tries to send data to the UE being in the sleep mode so that, when the UE wakes up, there is no data to be received. In the NR-Uu interface this situation is prevented by maintaining a well-defined agreement between the UE and the network or system in terms of the sleep and wake-up cycles. In other words, by configuring a UE with DRX by the gNB, the DRX is synchronized with the gNB.

A DRX cycle includes both the ON time and the OFF time within a fixed time interval, and for the NR Uu interface a short DRX cycle and a long DRX cycle is defined, where a short DRX cycle may span a few symbols within a time slot, and a long DRX cycle may span an entire time slot or multiple time slots. For example, when considering a base station, like a gNB, from the gNB side, the DRX cycle may be configured by transmitting to the UE the DRX-config information element, as it is depicted in FIG. 4(a). FIG. 4(b) is a table including the DRX-config field descriptions.

Also, a UE may adjust a DRX cycle using assistance information, and FIG. 5(a) illustrates an example of assistance information that may be provided or transmitted by the UE. The assistance information includes the delay budget report indicating the UE-preferred adjustment to connected mode DRX and also an indication of a preferred amount of increment/decrement to a long DRX cycle length with respect to a current configuration allowing the UE to indicate to the base station that a DRX-cycle duration is to be increased or decreased. FIG. 5(b) illustrates the delay budget report information element transmitted by the UE as part of the assistance information and including the values in number of milliseconds, namely msXX or msMinusXX indicating the increase or decrease of the DRX cycle length desired by the UE.

While there is a well-implemented mechanism for a DRX implementation between a gNB and a UE over the Uu interface, DRX is also to be implemented on the sidelink so as to meet, for example, the power saving requirements of sidelink UEs that are not connected to a constant power source, like handheld UEs. However, other than in the Uu operation, in the sidelink operation there is not necessarily a central point, like a gNB, allowing to synchronize the DRX cycles for the SL UEs.

Figure 1B:
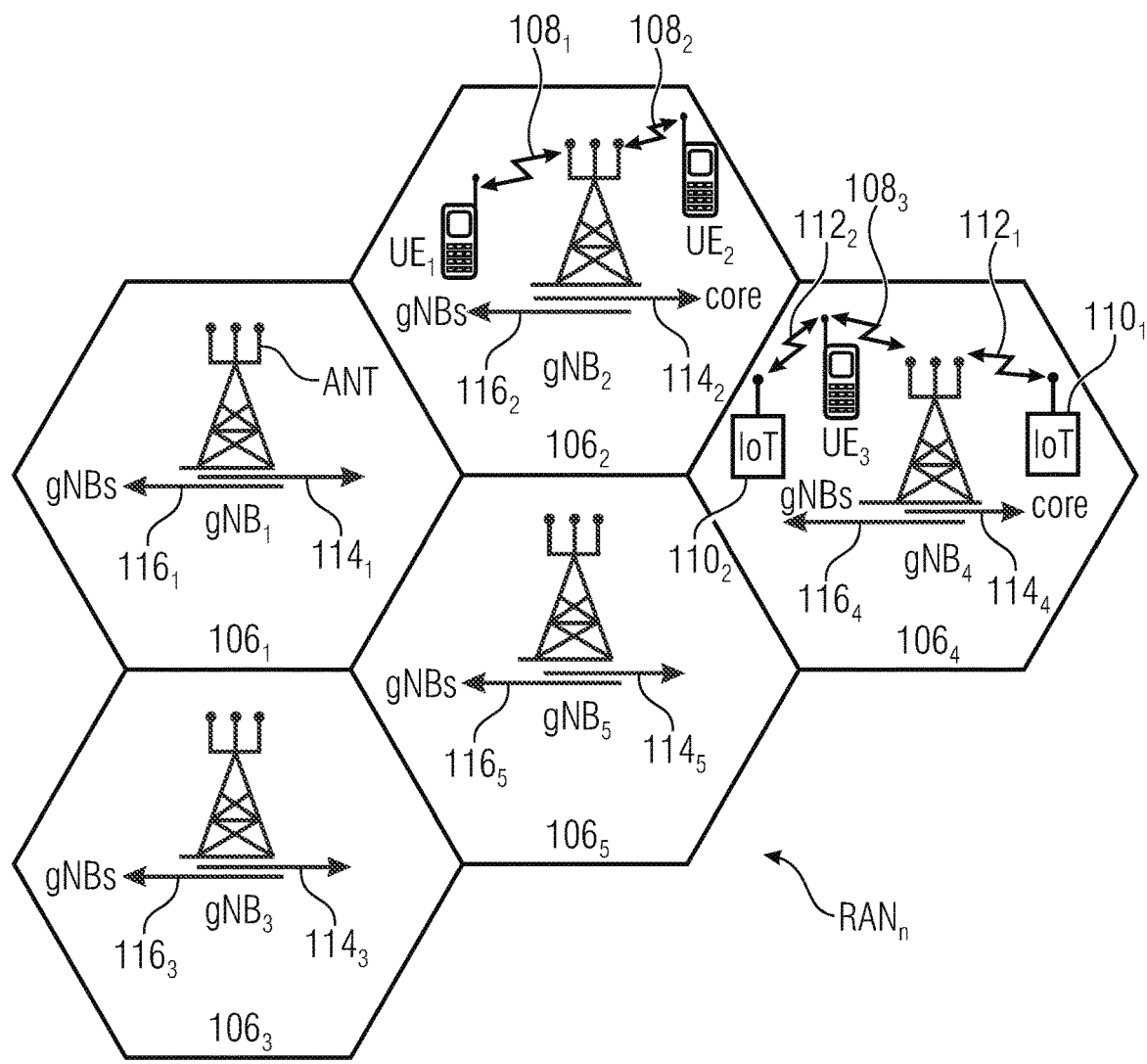
Figure 2:
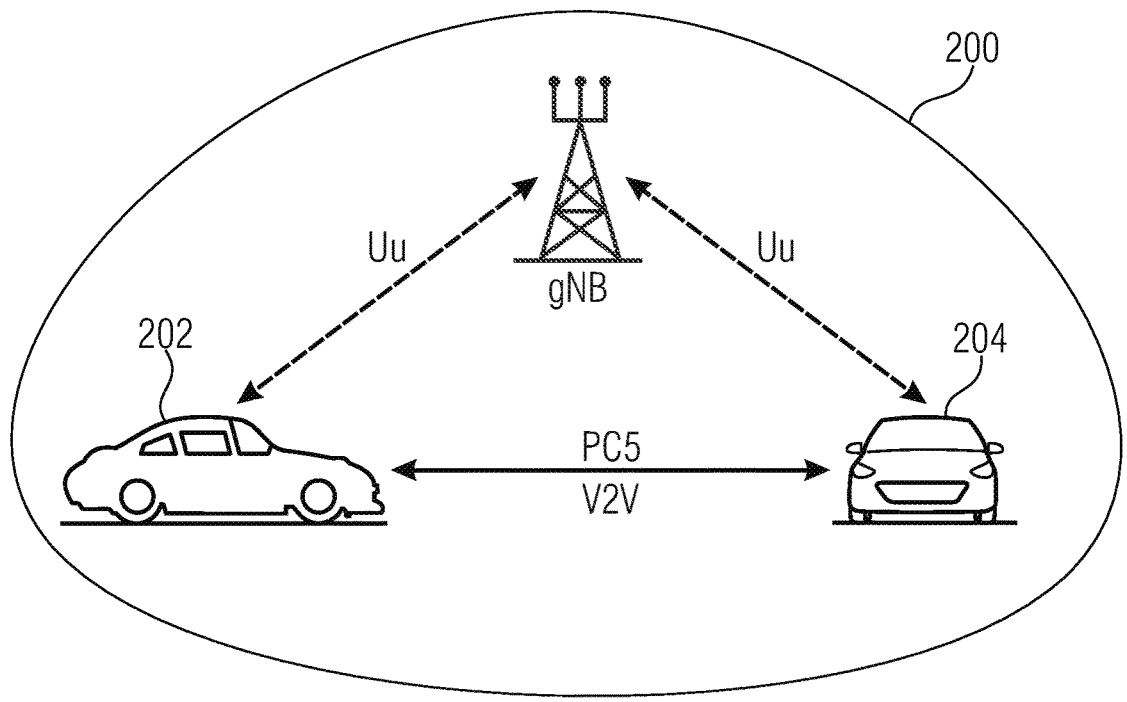
FIG. 2 is a schematic representation of an in-coverage scenario in which two UEs directly communicating with each other are both connected to a base station.
Figure 3:
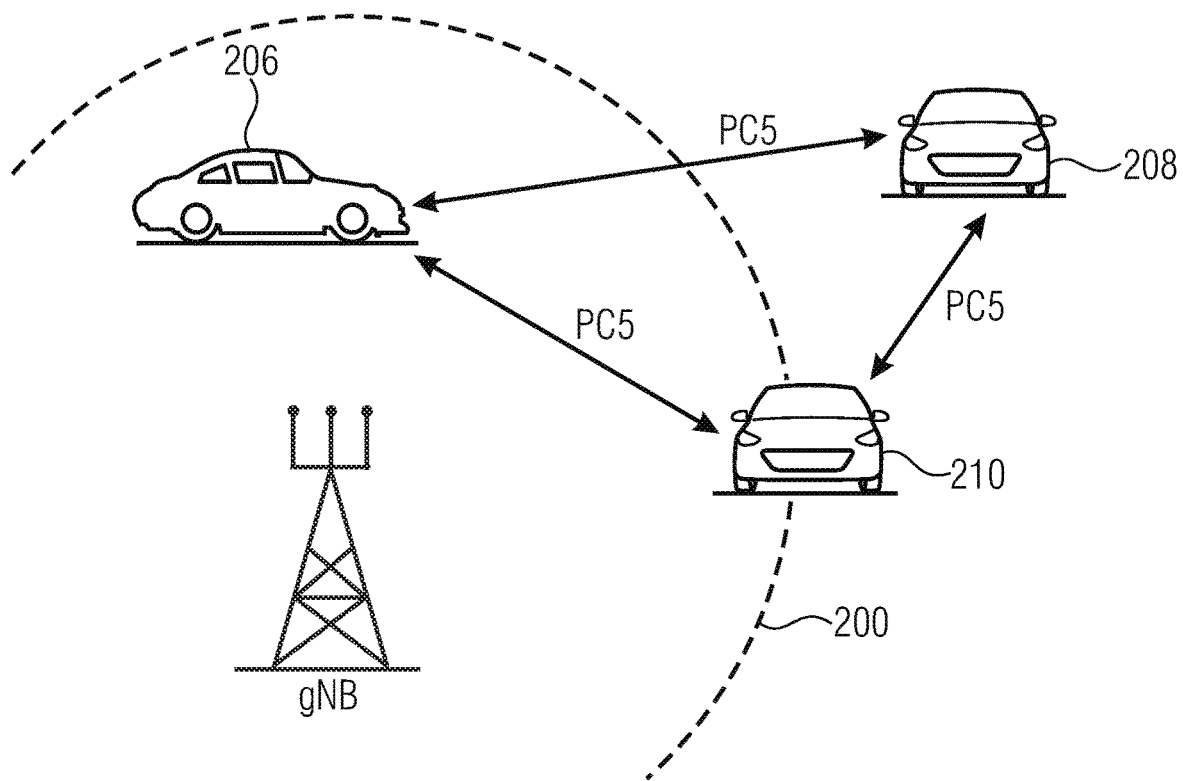
FIG. 3 is a schematic representation of an out-of-coverage scenario in which the UEs directly communicating with each other.
Figure 6:
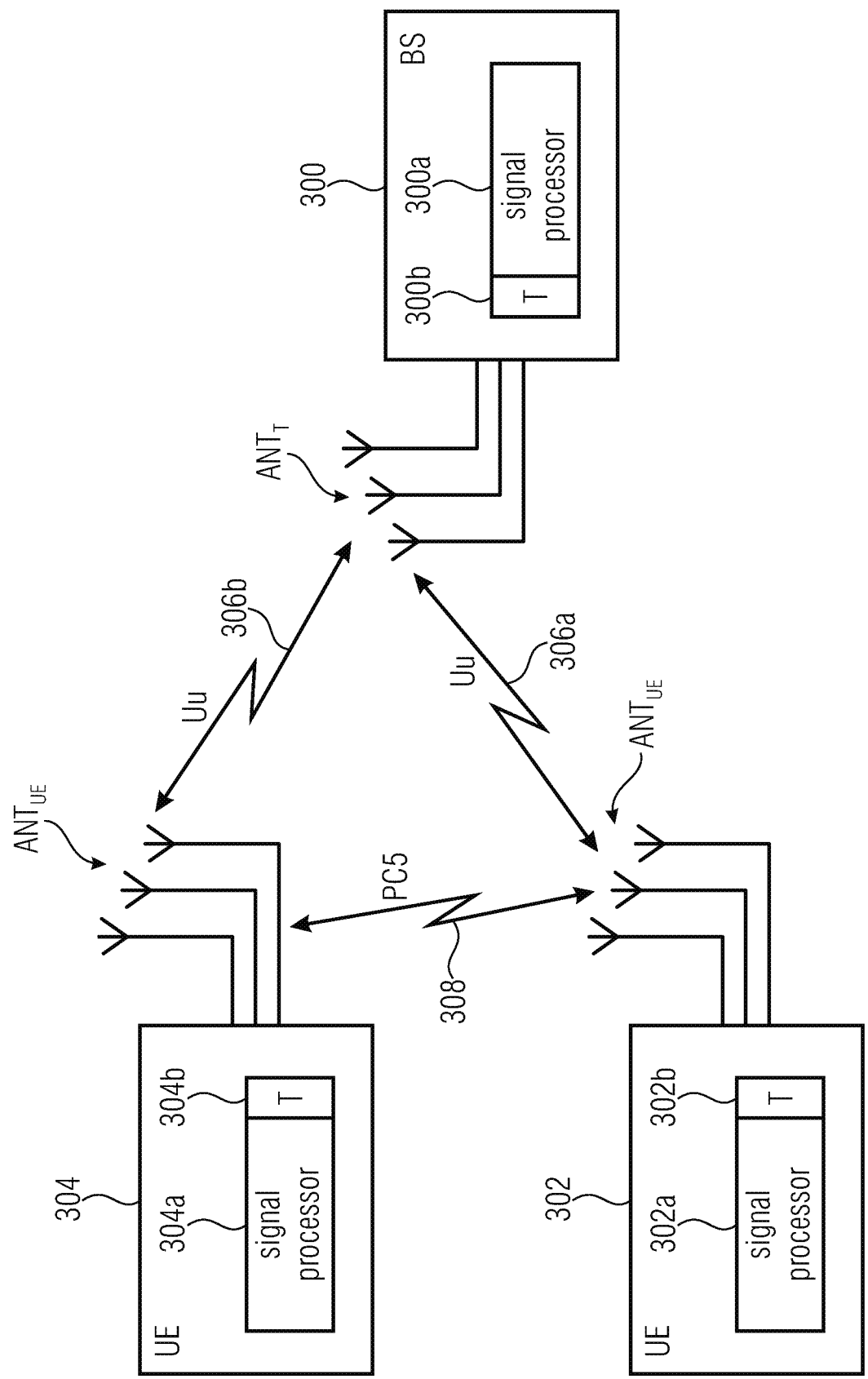
FIG. 6 is a schematic representation of a wireless communication system including a transmitter, like a base station, and one or more receivers, like user devices, UEs capable of operating in accordance with embodiments of the present invention.

The present invention provides approaches for implementing discontinuous reception, DRX, on a sidelink, SL, in a wireless communication system or network, and aspects of the present invention concern the DRX synchronization timeline, the possible cycle lengths of the DRX, an alignment of the DRX cycles with other SL UEs, a content of an ON duration of the NR SL DRX, the NR SL DRX signaling procedure, and the use of resources for the ON duration by other user devices. Embodiments of the present invention may be implemented in a wireless communication system as depicted in FIG. 1, FIG. 2 or FIG. 3 including base stations and users, like mobile terminals or IoT devices. FIG. 6 is a schematic representation of a wireless communication system including a transmitter 300, like a base station, and one or more receivers 302, 304, like user devices, UEs. The transmitter 300 and the receivers 302, 304 may communicate via one or more wireless communication links or channels 306a, 306b, 308, like a radio link. The transmitter 300 may include one or more antennas $ANT_T$ or an antenna array having a plurality of antenna elements, a signal processor 300a and a transceiver 300b, coupled with each other. The receivers 302, 304 include one or more antennas $ANT_{UE}$ or an antenna array having a plurality of antennas, a signal processor 302a, 304a, and a transceiver 302b, 304b coupled with each other. The base station 300 and the UEs 302, 304 may communicate via respective first wireless communication links 306a and 306b, like a radio link using the Uu interface, while the UEs 302, 304 may communicate with each other via a second wireless communication link 308, like a radio link using the PC5/sidelink (SL) interface. When the UEs are not served by the base station, are not be connected to a base station, for example, they are not in an RRC connected state, or, more generally, when no SL resource allocation configuration or assistance is provided by a base station, the UEs may communicate with each other over the sidelink (SL). The system or network of FIG. 6, the one or more UEs 302, 304 of FIG. 6, and the base station 300 of FIG. 6 may operate in accordance with the inventive teachings described herein.

First Aspect—DRX Configuration Source

User Device

The present invention provides a user device, UE, for a wireless communication system, the wireless communication system including a plurality of user devices, UEs,
    wherein the UE is to communicate with one or more further UEs using a sidelink, SL,
    wherein, to operate in a Discontinuous Reception, DRX, mode, the UE is to receive a DRX configuration from one of a plurality of DRX configuration sources, and
    wherein the plurality of DRX configuration sources are ranked such that each of the DRX configuration sources has a rank different from the remaining DRX configuration sources, and the UE is to select the DRX configuration from the DRX configuration source having the highest rank among the available DRX configuration sources.

In accordance with embodiments, the UE is to
    determine from the plurality of DRX configuration sources the available DRX configuration sources to which the UE is capable to connect, determine from the available DRX configuration sources the available DRX configuration source having the highest rank, and select the DRX configuration from the available DRX configuration source having the highest rank.

In accordance with embodiments, the plurality of DRX configuration sources are ranked based on one or more of the following:

an interface connecting a DRX configuration source to a user device, e.g., the Uu interface or the PC5 interface,
a type of the DRX configuration source, e.g., a gNB, a roadside unit, RSU, a UE,
a certain parameter included in a DRX configuration received from the DRX configuration source, e.g., a time stamp indicating how up-to-date the DRX configuration is, or a priority.

In accordance with embodiments, the plurality of DRX configuration sources comprises one or more of:

an access point, like a base station, gNB, or a gateway node, of the wireless communication system, the access point having a rank,
one or more first UEs authorized by the wireless communication system to transmit a DRX configuration or to coordinate the DRX, e.g., a road side unit, RSU, or a group leader UE, the first UEs having the same ranks or different ranks lower than the rank of the access point,
one or more second UEs to which the UE is connected for a communication over the SL, the second UEs having the same ranks or different ranks lower than the one or more ranks of the first UEs,
one or more third UEs transmitting on SL resources of the wireless communication system assistance information, the assistance information including one or more DRX configurations, the third UEs having the same ranks or different ranks lower than the
one or more ranks of the second UEs, one or more fourth UEs operating in the DRX mode and transmitting on SL resources of the wireless communication system and from which the UE obtains a DRX configuration by listening to a DRX cycle used at the fourth UEs, the fourth UEs having the same ranks or different ranks lower than the one or more ranks of the third UEs.

In accordance with embodiments, in case the UE is connected to a certain DRX configuration source, the UE is to limit the available DRX configuration sources to those available DRX configuration sources having the same or a higher rank than the certain DRX configuration source.

In accordance with embodiments, the certain DRX configuration source includes a base station having the highest rank, and the UE is to limit the available DRX configuration sources to the base station.

Method

The present invention provides a method for operating a user device, UE, of a wireless communication system in a Discontinuous Reception, DRX, mode, the wireless communication system including a plurality of user devices, UEs, and the UE communicating with one or more further UEs using a sidelink, SL, the method comprising:

receiving, by the UE, a DRX configuration from one of a plurality of DRX configuration sources,
wherein the plurality of DRX configuration sources are ranked such that each of the DRX configuration sources has a rank different from the remaining DRX configuration sources, and the UE is to select the DRX configuration from the DRX configuration source having the highest rank among the available DRX configuration sources.

Second Aspect—DRX Cycle Length

User Device

The present invention provides a user device, UE, for a wireless communication system, the wireless communication system including a plurality of user devices, UEs, wherein the UE is to communicate with one or more further UEs using a sidelink, SL,
wherein the UE is to operate in a Discontinuous Reception, DRX, mode in accordance with a DRX configuration including one or more DRX patterns defining a fixed length DRX cycle or an adaptive length DRX cycle for a time period the DRX configuration is valid, and
wherein, in case of a fixed length DRX cycle, an overall duration of a DRX cycle and the ON-OFF durations of the DRX cycle are fixed, and, in case of an adaptive length DRX cycle, an overall duration of a DRX cycle and/or the ON-OFF durations of the DRX cycle is adapted dependent on one or more parameters, e.g., parameters associated with the UE and/or the environment in which the UE is located.

In accordance with embodiments, the one or more parameters include one or more of the following:

a speed at which the UE is moving, wherein, when moving at a speed below a certain threshold, the DRX cycle is adapted to be a long DRX cycle, and, when moving at a speed at or above the certain threshold, the DRX cycle is adapted to be a short DRX cycle,
a presence of one or more further UEs, wherein, when a distance to the one or more further UEs is below a certain threshold, the DRX cycle is adapted to be a short DRX cycle, and, when a distance to the one or more further UEs is at or above the certain threshold, the DRX cycle is adapted to be a long DRX cycle,
a location at which the UE is located, wherein, when the location is an unsafe area, the DRX cycle is adapted to be a short DRX cycle, and, when the location is a safe area, the DRX cycle is adapted to be a long DRX cycle,
a nature of a transmission, wherein, when a data transmission entails periodic transmissions in shorter or longer intervals, a short or long DRX cycle is employed respectively.
an occupancy of one or more used resource pools, wherein the DRX cycle is adapted to longer or different ON durations if the monitored resources are busy above a certain threshold, e.g., by calculating a Channel Busy Ratio, CBR, on the monitored resources.

In accordance with embodiments, employing the adaptive length DRX cycle includes deactivating the DRX mode for a certain duration, and wherein, when a data transmission entails the UE to be ON for a given duration, which is longer than the ON duration of the DRX cycle, the UE is to deactivate DRX for the given duration, and after the data transmission is complete, the DRX cycle resumes.

Method

The present invention provides a method for operating a user device, UE, of a wireless communication system, the wireless communication system including a plurality of user devices, UEs, and the UE communicating with one or more further UEs using a sidelink, SL, the method comprising:

operating the UE in a Discontinuous Reception, DRX, mode in accordance with a DRX configuration including one or more DRX patterns defining a fixed length DRX cycle or an adaptive length DRX cycle for a time period the DRX configuration is valid, wherein, in case of a fixed length DRX cycle, an overall duration of a DRX cycle and the ON-OFF durations of the DRX cycle are fixed, and, in case of an adaptive length DRX cycle, an overall duration of a DRX cycle and/or the ON-OFF durations of the DRX cycle is adapted dependent on one or more parameters, e.g., parameters associated with the UE and/or the environment in which the UE is located.

Third Aspect—DRX Alignment

User Device

The present invention provides a user device, UE, for a wireless communication system, the wireless communication system including a plurality of user devices, UEs, wherein the UE is to communicate with one or more further UEs using a sidelink, SL, wherein the UE is to operate in a Discontinuous Reception, DRX, mode, and wherein the UE is to align the DRX cycles with an access point, like a base station, gNB, or a gateway node, of the wireless communication system and/or one or more of the further UEs.

In accordance with embodiments, to align a DRX cycle between the UE and a base station, in case the UE is connected to the base station, the UE has its DRX cycle aligned with the base station, responsive to being configured by the base station with one or more DRX configurations, and/or in case the UE has its DRX cycle aligned with one or more of the further UEs it is connected to for the SL communication, the UE is to signal to the base station one or more of its existing DRX cycles in order to inform the base station.

In accordance with embodiments, to align a DRX cycle between the UE and one or more of the further UEs, the UE is to listen to one or more of the further UEs being in proximity of the UE, and to adapt its DRX cycle to the one or more DRX cycles used by one or more of the further UEs.

In accordance with embodiments, in case listening to one or more of the further UEs being in proximity of the UE yields multiple DRX durations, the UE is to enable multiple DRX cycles.

In accordance with embodiments, for enabling multiple DRX cycles, the UE is to create a new DRX pattern formed out of the multiple DRX cycles.

In accordance with embodiments, the new DRX cycle is the least common multiple of the multiple DRX cycles.

In accordance with embodiments, each of the DRX configurations available defines a DRX duration having a starting point in time that is common for all defined DRX durations, wherein the DRX configuration defines a fixed duration selected from a set of fixed durations and an ON-OFF duration.

Method

The present invention provides a method for operating a user device, UE, of a wireless communication system in a Discontinuous Reception, DRX, mode, the wireless communication system including a plurality of user devices, UEs, and the UE communicating with one or more further UEs using a sidelink, SL, the method comprising:

aligning, by the UE, the DRX cycles of the UE with an access point, like a base station, gNB, or a gateway node, of the wireless communication system and/or one or more of the further UEs.

Fourth Aspect—Content of ON Duration of DRX Cycle

User Device

The present invention provides a user device, UE, for a wireless communication system, the wireless communication system including a plurality of user devices, UEs, wherein the UE is to communicate with one or more further UEs using a sidelink, SL, wherein the UE is to operate in a Discontinuous Reception, DRX, mode, and wherein an ON duration of a DRX cycle depends on a certain purpose for which the UE is to use the ON duration.

In accordance with embodiments, the UE is to select the ON duration dependent on whether the UE is to process
(i) only control data, like data in the PSCCH, or
(ii) only payload data, like data in the PSSCH, or
(iii) only feedback data, like data in the PSFCH, or
(iv) a combination of two or more (i) to (iv).

In accordance with embodiments, the certain purpose includes one or more of the following:

the UE is to listen to one or more of the further UEs for the purpose of sensing, the UE is to determine available resources for a transmission, the UE is to transmit control and data, the UE is to listen to the feedback from one or more of the further UEs, the UE is to receive control from one or more of the further UEs, the UE is to determine the load in a given band.

In accordance with embodiments, the ON duration spans one or a combination of the following:

only the duration of the PSCCH, like the first 2 or 3 symbols of a time slot, e.g., for receiving from the one or more further UEs a first stage SCI and for decoding the one or more first stage SCIs, or the duration of the PSCCH and a portion of the duration of the PSSCH so as to allow the UE to carry out a transmission, e.g., to enable the UE to transmit a first stage SCI in the PSCCH followed a second stage SCI and data in the PSSCH, or to allow the UE to listen to the first and second stage control information, which are transmitted respectively in the PSCCH and PSSCH, or only the duration of the PSFCH, e.g. to determine one or more subchannels available for a transmission by the UE, or the duration of the PSCCH, a portion of the duration of the PSSCH and the duration of the PSFCH, e.g., to provide a discontinuous ON duration within a time slot for a transmission of data not requiring the UE to be active the entire time slot and for receiving feedback.

In accordance with embodiments, the UE is to signal the ON duration to one or more of the further UEs.

Method

The present invention provides a method for operating a user device, UE, of a wireless communication system in a Discontinuous Reception, DRX, mode, the wireless communication system including a plurality of user devices, UEs, and the UE communicating with one or more further UEs using a sidelink, SL, the method comprising:

setting, by the UE, an ON duration of a DRX cycle dependent on a certain purpose for which the UE is to use the ON duration.

Fifth Aspect—DRX Signaling Procedure

User Device

The present invention provides a user device, UE, for a wireless communication system, the wireless communication system including a plurality of user devices, UEs,
wherein the UE is to communicate with one or more further UEs using a sidelink, SL,
wherein, to operate in a Discontinuous Reception, DRX, mode, the UE is to receive one or more DRX configurations from a DRX synchronization source, and
wherein
the DRX synchronization source includes a base station, the UE is to receive from the base station a control message, e.g. SIB, including the one or more DRX configurations, or
the DRX synchronization source includes one or more of the further UEs, the UE is to receive the one or more DRX configurations from a further UE using, e.g., a PC5 RRC signaling or a SCI for a given transmission.

In accordance with embodiments, the one or more DRX configurations include some or all of the following information:
a DRX cycle duration overall duration of a single DRX cycle, including the ON and OFF durations,
an ON duration indicating the duration during which a UE may transmit and receive,
an inactivity timer indicating the time duration a UE has to remain ON after the reception of a control signal and/or a transmission of a packet, e.g. for awaiting a HARQ feedback,
a retransmission timer indicating the time duration a UE has to remain ON because a control signal has indicated a retransmission for a given packet
a communication range requirement within which the UE is to expect or transmit feedback regarding a transmission transmitted or received.

In accordance with embodiments, to operate in the DRX mode, responsive to receiving the one or more DRX configurations the UE is to activate the DRX mode.

In accordance with embodiments, the UE is to activate the DRX mode responsive to
a lapse of the inactivity timer, or
an explicit signaling, either directly or indirectly, by a further UE to activate or deactivate the DRX mode, or
a HARQ process being enabled, or
a switch to a reception only mode, or
a higher layer signaling to conserve power, or
a change in QoS, or
the UE being in a certain geo location.

In accordance with embodiments, the explicit signaling by a further UE includes:
the use of dedicated fields in a SCI pertaining to a given transmission, with information regarding a duration of a DRX activation or deactivation,
the use of the "Resource reservation field" in the SCI to indicate the presence of further transmissions during which the UE is to remain ON in order to receive these transmissions,
the use of the "Priority" field in the SCI to indicate the packet delay budget, PDB, associated to a transmission, during which the UE is to remain ON in order to receive any further retransmissions or HARQ retransmissions.

In accordance with embodiments, in case the UE is to activate the DRX mode responsive to a HARQ process being enabled,
when only NACK is enabled, the UE, when receiving data, is to stay ON until successfully receiving the transmission, or, when transmitting data, is to stay ON for a time duration for receiving the NACK,
when both ACK and NACK are enabled, the UE, when receiving data, is to stay ON until successfully receiving the transmissions, or, when transmitting data, is to stay ON for a time duration for receiving the ACK or the NACK.

In accordance with embodiments, a time duration for a retransmission is defined by
the UE activating a HARQ timer when a HARQ transmission is received and which defines a time window in which the UE is to expect a retransmission before going into the OFF mode or starting the inactivity timer, or
extending the inactivity timer, e.g., to be 1 or 2 HARQ RTTs long, so that the UE can finish a transmission within the ON duration, or
the communication range requirement.

In accordance with embodiments,
the wireless communication system includes a plurality of DRX configuration sources, the plurality of DRX configuration sources being ranked such that each of the DRX configuration sources has a rank different from the remaining DRX configuration sources, and
in case the UE receives two or more DRX configurations with different start times and durations, the UE is to select the DRX configuration received from the DRX configuration source having the highest rank.

In accordance with embodiments, responsive to selecting the DRX configuration from the DRX configuration source having the highest rank, the UE is to send assistance information to the one or more other DRX configuration sources so as to inform the other DRX configuration source about the presence of a DRX configuration sources having a higher rank, thereby enabling the other DRX configuration source UE to align its timing with the selected DRX configuration source.

In accordance with embodiments, the assistance information includes information allowing to alter the characteristics of a DRX cycle.

In accordance with embodiments, the characteristics of a DRX cycle includes one or more of:
a duration of the DRX cycle length, e.g., by maintaining the ON duration and reducing the OFF duration,
an offset of the DRX cycle to match a start time,
an ON duration of the DRX cycle.

Method

The present invention provides a method for operating a user device, UE, for a wireless communication system in a Discontinuous Reception, DRX, mode, the wireless communication system including a plurality of user devices, UEs, and the UE communicating with one or more further UEs using a sidelink, SL, the method comprising:
receiving, by the UE, one or more DRX configurations from a DRX synchronization source,
wherein
when the DRX synchronization source includes a base station, receiving, by the UE, from the base station a control message, e.g. SIB, including the one or more DRX configurations, or when the DRX synchronization source includes one or more of the further UEs, receiving, by the UE, the one or more DRX configurations from a further UE using, e.g., a PC5 RRC signaling or a SCI for a given transmission.

Sixth Aspect—Non-DRX-UE Avoiding ON Duration Resources

User Device

The present invention provides a user device, UE, for a wireless communication system, the wireless communication system including a plurality of user devices, UEs,
  wherein the UE is to communicate with one or more further UEs using a sidelink, SL,
  wherein the UE does not operate in a Discontinuous Reception, DRX, mode but is aware of one or more of the further UEs operating in the DRX mode, and
  wherein the UE is to avoid resources for a transmission that are used by a further UE during its ON duration.
In accordance with embodiments, to avoid resources used by a further UE during its ON duration, the UE is to
  exclude resources that occur within the ON duration, or.
  add a penalty for using resources that occur within the ON duration, or.
  use resources that occur within the ON duration only when no other resource is available.
In accordance with embodiments, the penalty includes one or more of:
  a restriction penalty, e.g., resources may only be used for transmissions above a certain priority,
  a sensing penalty, e.g., when performing measurements, a value may be added to the RSSI measurements,
  a selection penalty so that one or more certain resources are less likely to be selected, e.g., because they are down ranked after sensing.
In accordance with embodiments, the selection penalty is be based on a number of UEs using the certain resource during their ON durations, e.g., the more UEs use the certain resource the less likely is it selected.

Method

The present invention provides a method for operating a user device, UE, for a wireless communication system, the wireless communication system including a plurality of user devices, UEs, and the UE communicating with one or more further UEs using a sidelink, SL, not operating in a Discontinuous Reception, DRX, mode but being aware of one or more of the further UEs operating in the DRX mode, the method comprising:
  avoiding, by the UE, resources for a transmission that are used by a further UE during its ON duration.

General

In accordance with embodiments, the UE comprise one or more of a power-limited UE, or a hand-held UE, like a UE used by a pedestrian, and referred to as a Vulnerable Road User, VRU, or a Pedestrian UE, P-UE, or an on-body or hand-held UE used by public safety personnel and first responders, and referred to as Public safety UE, PS-UE, or an IoT UE, e.g., a sensor, an actuator or a UE provided in a campus network to carry out repetitive tasks and entailing input from a gateway node at periodic intervals, or a mobile terminal, or a stationary terminal, or a cellular IoT-UE, or a vehicular UE, or a vehicular group leader (GL) UE, or an IoT or narrowband IoT, NB-IoT, device, or a ground based vehicle, or an aerial vehicle, or a drone, or a moving base station, or road side unit (RSU), or a building, or any other item or device provided with network connectivity enabling the item/device to communicate using the wireless communication network, e.g., a sensor or actuator, or any other item or device provided with network connectivity enabling the item/device to communicate using a sidelink the wireless communication network, e.g., a sensor or actuator, or any sidelink capable network entity.

System

The present invention provides a wireless communication system, comprising a plurality of user devices, UEs, in accordance with the present invention and configured for a sidelink communication using, for example resources from a set of sidelink resources of the wireless communication system.

In accordance with embodiments the wireless communication system comprises one or more base stations, wherein the base station comprises one or more of a macro cell base station, or a small cell base station, or a central unit of a base station, or a distributed unit of a base station, or a road side unit (RSU), or a UE, or a group leader (GL), or a relay or a remote radio head, or an AMF, or an SMF, or a core network entity, or mobile edge computing (MEC) entity, or a network slice as in the NR or 5G core context, or any transmission/reception point, TRP, enabling an item or a device to communicate using the wireless communication network, the item or device being provided with network connectivity to communicate using the wireless communication network.

Computer Program Product

Embodiments of the present invention provide a computer program product comprising instructions which, when the program is executed by a computer, causes the computer to carry out one or more methods in accordance with the present invention.

First Aspect—DRX Configuration Source

In accordance with embodiments of the first aspect of the present invention, a sidelink UE employs DRX and selects a source for the DRX configuration from a hierarchical list of sources, also referred to as ranked DRX configuration sources.

Figure 7:
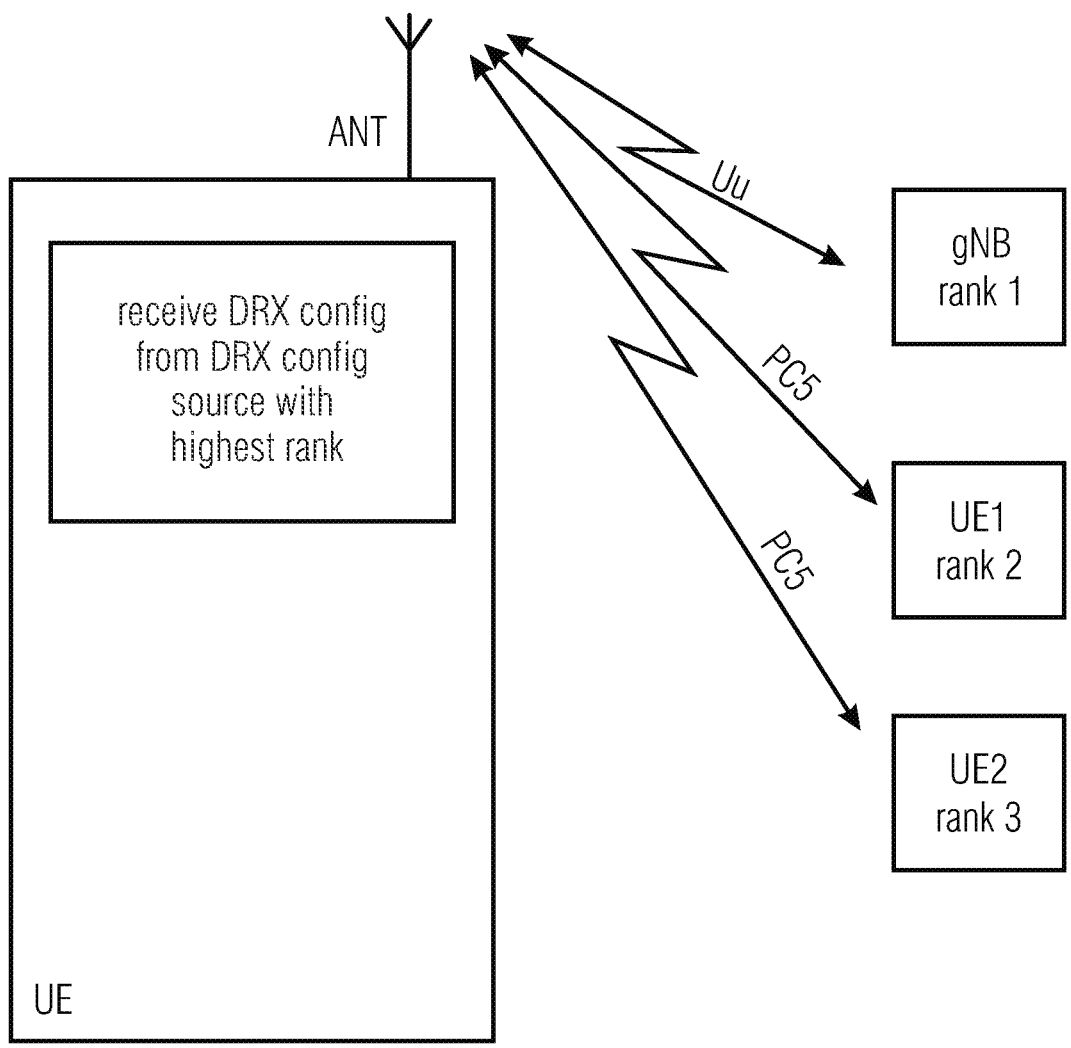
FIG. 7 schematically illustrates a user device in accordance with embodiments of the first aspect of the present invention.

FIG. 7 schematically illustrates a user device in accordance with embodiments of the first aspect of the present invention. The user device UE includes an antenna ANT for a wireless communication in a wireless communication network or system, like the one depicted in FIG. 1, FIG. 2 or FIG. 3. The UE may communicate with one or more further UEs, like UE1 and UE2, over the sidelink, for example, using the PC5 interface. The UE may also be connected via the Uu interface to a base station, like the gNB illustrated in FIG. 7, for example, in case the UE is in Mode 1, as explained above with reference to FIG. 2. For operating in the DRX mode, the UE may receive a DRX configuration from a DRX configuration source. In the embodiment depicted in FIG. 7 it is assumed that the gNB, the UE1 and the UE2 are DRX configuration sources from which the UE may obtain a DRX configuration for operating in the DRX mode. In accordance with embodiments, the DRX configuration sources are ranked such that each of the DRX configuration sources has a rank different from the other DRX configuration sources. In the embodiment of FIG. 7, the gNB is a DRX configuration source with the highest rank, rank 1. The UE1 is also a configuration source, however, with a lower rank than the gNB, namely a rank 2, and the UE2 is a further DRX configuration source having a rank being lower than the rank of the UE1 and the rank of the gNB, for example, having a rank 3. The UE may determine which of the DRX configuration sources are available, for example, to which of the DRX configuration sources a communication may be established, and among these available DRX configuration sources, the UE receives or selects the DRX configuration to be employed from the source having the highest rank. For example, in the situation as depicted in FIG. 7, the DRX configuration source with the highest rank is the gNB, so that, although the UE may also connect to the UE1 and the UE2, because of the highest rank the UE receives the DRX configuration from the gNB. In case the UE is, for example, in mode 2 and is not connected to the gNB, the available DRX configuration sources are the UE1 and the UE2, and the UE may receive the DRX configuration from the UE1 as it has the highest rank, namely rank 2, among the available DRX configuration sources.

The respective DRX configuration sources may be ranked based on one or more of the following:
- an interface connecting a DRX configuration source to a user device, e.g., the Uu interface or the PC5 interface,
- a type of the DRX configuration source, e.g., rank 1 category sources may include a gNB, rank 2 category sources may include a roadside unit, RSU, relay UEs that relay the DRX configuration from a gNB to the UE, base UEs such as police cars/firetrucks or a group leader (GL) UE, and rank 3 category sources may be another UE,
- a certain parameter included in a DRX configuration received from the DRX configuration source, e.g., a time stamp indicating how up-to-date the DRX configuration is, or a dedicated priority parameter attached to the DRX source for a given category of UEs, where the category of UEs may be public safety UEs or IoT UEs.

In accordance with embodiments, the following DRX configuration sources may be provided which are ranked as follows:
- An access point, like a base station, gNB, or a gateway node, of the wireless communication system. The access point has a first rank.
- One or more first UEs authorized by the wireless communication system to transmit a DRX configuration or to coordinate the DRX, e.g., a road side unit, RSU, or a group leader UE, GL-UE. The first UEs may be devices not operating in the DRX mode but communicate with other UEs, like a pedestrian UE P-UE or a public safety UE, PS-UE, over the sidelink. The first UEs have the same ranks or different ranks lower than the first rank of the access point.
- One or more second UEs to which the UE is connected for a communication over the SL, e.g., a V-UE, a P-UE or a PS-UE. The second UEs have the same ranks or different ranks lower than the one or more ranks of the second UEs of the first UEs, One or more third UEs transmitting on SL resources of the wireless communication system assistance information, e.g., other PS-UEs or P-UEs not communicating with the UE. The assistance information includes one or more DRX configurations or information for modifying a DRX configuration. The third UEs have the same ranks or different ranks lower than the one or more ranks of the second UEs,
- One or more fourth UEs operating in the DRX mode and transmitting on SL resources of the wireless communication system, like other PS-UEs or P-UEs. The UE listens to a DRX cycle used at a fourth UEs for adapting its DRX cycle. The fourth UEs have the same ranks or different ranks lower than the one or more ranks of the third UEs For example, for a certain UE a top level DRX configuration source, i.e. the source having the highest rank, may be a singular source that provides one or more global DRX configurations, such as a gNB, a base UE, like a patrol car or a fire truck, or a gateway node, e.g., in case of campus networks. The next level or rank for the certain UE may be UEs of a higher class, like V-UEs or GL UEs, followed by UEs of the same class, like neighbouring UEs. In accordance with embodiments, different types of UEs may be provided with different DRX configuration sources or DRX synchronization sources which, as described above, are selected in a hierarchical manner. In accordance with embodiments, four different types of UEs communicating over a sidelink PC5 may be considered:
- Vulnerable road users, VRUs, like pedestrian UEs, P-UEs: these UEs are basically hand-held UEs used by pedestrians, like mobile phones. The UE may transmit its location periodically to other VRUs so that these other VRUs are aware of the UE's location. The VRUs receive a transmission from the UE in case they are in proximity and that there is a possibility of a collision.
- Public safety UEs, PS-UEs: such UEs may be on-body or hand-held UEs used by public safety personnel and first responders, like policemen, paramedics and firemen. The PS-UEs entail both transmit and receive functionality at all times.
- IoT-UEs: these UEs may include sensors in a sensor network, actuators or other low power nodes or powered relay and/or processing nodes.
- Industrial IoT-UEs: these UEs may be devices in a closed campus network designed to carry out certain tasks and obtaining inputs from a gateway node at periodic intervals. Examples for IoT-UEs are robots on a factory floor carrying out repetitive tasks.

When considering the above types of UEs, they may employ different DRX synchronization sources, more specifically the hierarchical order of the synchronization sources may be different for the above-described different types of UEs.

For example, a vulnerable road user VRU or pedestrian UE, P-UE, may receive the DRX synchronization information and the respective timelines, as well as the DRX configuration, for example via RRC, from the gNB, in case the P-UE operates in Mode 1 or in Mode 2 but is in coverage of the gNB. When the P-UE moves out of coverage, the P-UE may receive the DRX synchronization information from another neighboring UE which may be a vehicular UE, V-UE, or a neighboring P-UE. The DRX synchronization information may be sent to the P-UE by means of the above-described assistance information (see FIG. 5) from the neighboring UE or the P-UE may listen to the neighboring UE's DRX cycle. For a P-UE, the hierarchical order for receiving the DRX configuration or synchronization information may be as follows:
- rank 1: a gNB providing the DRX configuration,
- rank 2: one or more V-UEs providing assistance information for either relaying the DRX configuration from the gNB or for modifying the DRX configuration,
- rank 3: one or more other P-UEs to the DRX cycles of which the P-UE listens for adapting its DRX cycle.

A public safety UE, PS-UE, may receive the DRX configuration or synchronization from the base UE to which it is connected to, apart from the gNB. This base UE may be a patrol car, an ambulance, or a firetruck that provides the synchronization information to the PS-UE. The PS-UE may also receive the DRX synchronization information from a group lead UE, GL-UE, that is enabled in a particular location. Thus, the hierarchical order for receiving the DRX synchronization information at a PS-UE may be as follows:
 Rank 1: a gNB providing the DRX configuration,
 Rank 2: a base UE to which the PS-UE is connected and which provides the DRX configuration, or another UE that relays the DRX configuration from a gNB,
 Rank 3: a GL-UE attending to the same even as the PS-UE and providing the DRX configuration,
 Rank 4: one or more V-UEs providing assistance information for modifying the DRX configuration,
 Rank 5: one or more other PS-UEs to the DRX cycles of which the PS-UE listens for adapting its DRX cycle.

IoT-UEs or industrial IoT-UEs may receive the DRX configuration or synchronization information from a gateway node or UE to which it is connected to within the network, like the sensor network or the campus network. The IoT-UE may not be connected to an external network and is not be able to receive DRX information from a gNB. For an IoT-UE, the hierarchical order for receiving the DRX synchronization may be as follows:
 Rank 1: a gateway node or UE providing the DRX configuration,
 Rank 2: one or more other IoT-UEs providing assistance information for modifying the DRX configuration,
 Rank 3: one or more other IoT-UEs to the DRX cycles of which the IoT-UE listens for adapting its DRX cycle.

In accordance with other embodiments the ranking may be based on a reception quality, since gNBs may transmit with higher power than UEs, so they may be easily distinguished from UEs. For example, typical PHY measures, like SNR, SINR, correlation peak above a threshold, etc., may be used to evaluate the reception quality.

The above-described DRX configuration sources not only provide the DRX configuration for the UE but are also the DRX synchronization sources so as to allow the UE to synchronize its DRX cycles using the DRX sync information received from the DRX configuration source.

In accordance with embodiments, the UE may disable the ranking of the DRX configuration sources. For example, when the UE is connected to a certain DRX configuration source, it may no longer consider DRX configuration sources with a lower rank. In other words, the UE may limit the available DRX configuration sources to those having the same or a higher rank than the currently used DRX configuration source. For example, when the UE uses a gNB as the DRX configuration source which has the highest rank, the UE limits the available DRX configuration sources to one source, namely the gNB.

Thus, in accordance with embodiments of the present, a UE may determine its DRX configuration or synchronization source in a hierarchical manner from a plurality of available DRX configuration or synchronization sources each being associated with a certain rank in a hierarchical order. This is advantageous because for DRX cycles to work in an effective manner between UEs, the UEs need to be in sync with each other so that their ON durations align. All UEs that are able to receive DRX configurations from the highest DRX synchronization source aligns their ON durations and efficiently communicate with each other, and, at the same time, achieve a power saving by going to sleep in the OFF durations. This is with the assurance that the UE does not miss out on listening to any critical transmission as long as the DRX cycles are in sync with each other.

Furthermore, with the use of relaying DRX configurations from the gNB as well as assistance information between UEs, all UEs within a certain area, but with different synchronization sources, may align themselves to a common ON duration, to achieve considerable power saving.

Second Aspect—DRX Cycle Length

Figure 8:
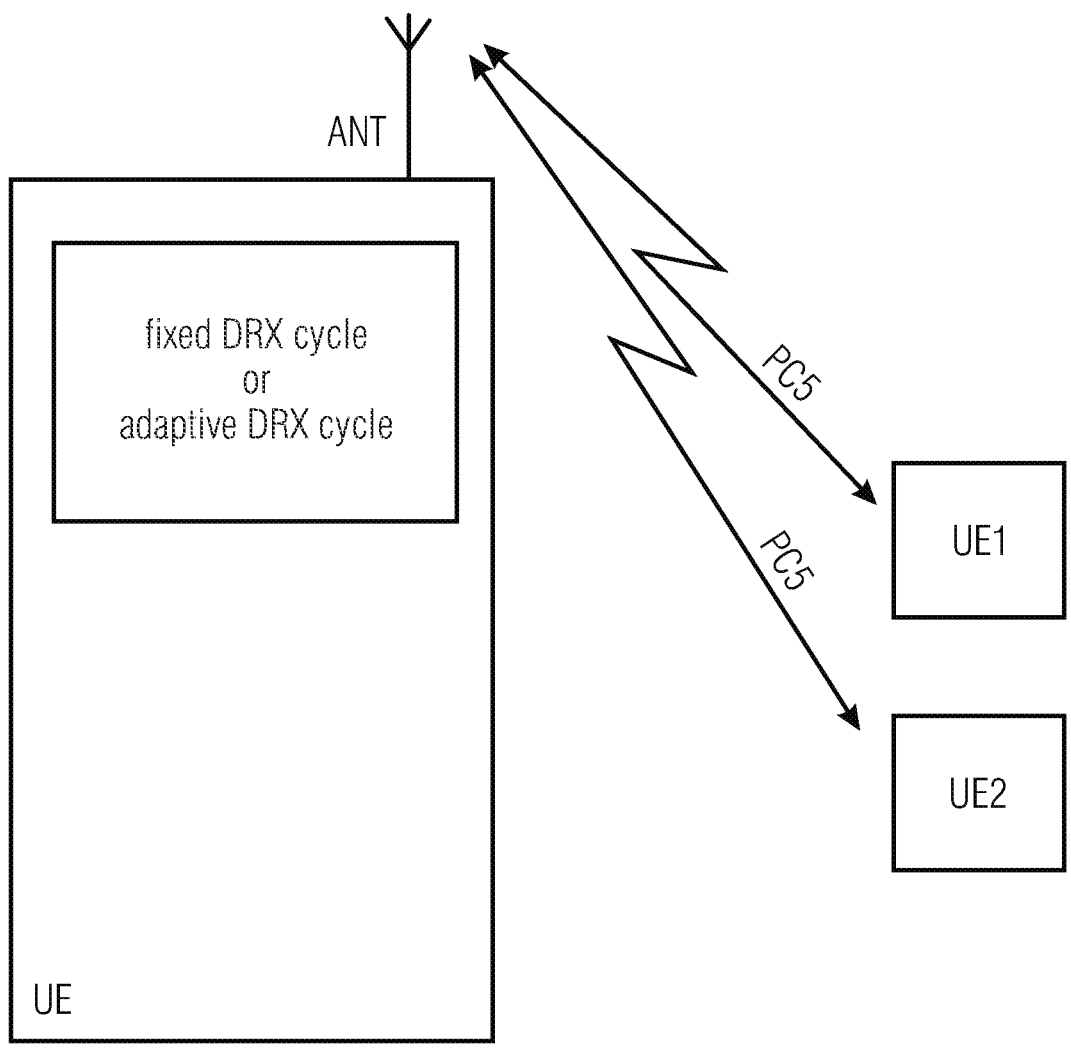
FIG. 8 schematically illustrates a UE in accordance with embodiments of the second aspect of the present invention.

In accordance with embodiments of a second aspect of the present invention, a DRX cycle may be fixed or adaptive. FIG. 8 schematically illustrates a UE in accordance with embodiments of the second aspect of the present invention including an antenna ANT for a sidelink communication using, for example, the PC5 interface, with one or more further UEs, like UE1 and UE2 illustrated in FIG. 8. The UE of FIG. 8 operates in accordance with the DRX mode, on the basis of a DRX configuration including a fixed length DRX cycle or an adaptive length DRX cycle for a time period during which the DRX configuration at the UE is valid. The DRX cycles contain an ON duration and an OFF duration, and may be defined in a simple ON-OFF manner, or in the form of a DRX pattern.

DRX patterns are essentially a sequence of ON and OFF durations that are defined within a fixed DRX cycle. The DRX cycle may span multiple symbols or time slots. Given that a UE is used to listen to only periodic transmissions, but where each transmission varies in length, the DRX cycle may be adapted to such a pattern by defining ON durations of varying time, when the UE is expected to listen to transmissions, and OFF durations when the UE sleeps to save power. In one example, the UE may select a specific DRX pattern depending on its current battery status. This may contain a longer ON duration in the first part of the pattern, e.g., for decoding the control channel in every slot in a first time period, and a shorter ON duration in the remaining part. In the shorter ON duration part of the pattern, the UE may only decode the control channel in every n-th slot. This may be applied similarly for all channels used in the ON duration part, e.g., the PSCCH, PSFCH, and/or PSSCH.

In case the DRX configuration indicates a fixed length DRX cycle, the overall duration of a DRX cycle and the ON-OFF durations of the DRX cycle are fixed. On the other hand, in case the DRX configuration indicates an adaptive length DRX cycle, an overall duration of the DRX cycle and/or the ON-OFF durations of the DRX cycles may be adapted dependent on one or more parameters, for example parameters associated with the UE and/or the environment in which the UE is located.

In accordance with embodiments, the indication whether the DRX cycle has a fixed length or an adaptive length is included in the initial DRX configuration received at the UE, for example from a DRX configuration source in a way as described with regard to the first aspect of the present invention (see FIG. 7 and the associated description). In accordance with other embodiments, the configuration of the DRX cycle may change during operation of the UE. For example, responsive to DRX synchronization information received at the UE from a DRX synchronization source in way as described above with reference to FIG. 7, a different DRX cycle may be signaled to the UE by a selected DRX synchronization source, as described above with reference to FIG. 7. In other words, in accordance with such embodiments, the DRX synchronization information may contain the overall duration of the DRX cycle, including the time duration during which the UE is in the ON phase, where it may transmit and receive data, as well as the OFF phase. The DRX sync information may signal different cycle durations, so that a cycle length may be fixed or adaptive.

In case of a fixed length DRX cycle, the overall duration and its ON-OFF duration is fixed for the time period the DRX configuration is valid, for example, until receipt of new DRX synchronization information indicating a different DRX cycle configuration. The ON-OFF duration may be defined in the form of a pattern as well.

In case the DRX synchronization information indicates an adaptive length DRX cycle, the DRX cycle may be a combination of short and long DRX cycles, and the duration may be based on the above-mentioned parameters associated with the UE. Again, this adaptive length cycle may be valid for the time period the current DRX configuration is valid, and the configuration may change responsive to new DRX synchronization information. In accordance with embodiments the duration of the adaptive length DRX cycle may be based on one or more of the following parameters:

- The speed at which the UE travels or is moving: for example, when the UE is a P-UE, and the user is walking, the UE moves at a low speed and hence a long DRX cycle is employed. If the user of the UE is moving faster, for example when he is riding a bicycle or another vehicle, or when he is running, a short DRX cycle may be used so as to have longer ON periods, thereby transmitting its location with higher periodicity to surrounding UEs.
- The presence of other UEs, like V-UEs: for example, in case the UE is at a traffic intersection, on a busy road or at a high accident prone area when being in close proximity to one or more V-UEs, a short DRX cycle may be used. In case the UE is away from V-UEs, for example in a park or within a safer area, a long DRX cycle may be used. For example, when the UE is in-doors or in another area which is considered safe with regard to vehicles, no sidelink communication with a V-UE may be needed, and therefore the sidelink communication to V-UEs may be switched off, or the sidelink communications may be switched off entirely.
- The nature of a data transmission: in case the data transmission entails the UE to be ON for a given duration, which is longer than the ON duration of the DRX cycle, the UE may deactivate DRX for that given duration. After the transmission is complete, the DRX cycle may be resumed. In accordance with other embodiments, if the data transmission entails a periodic transmission in short and longer intervals, a short or a long DRX cycle may be employed.
- The occupancy of one or more resource pools used for the SL communication. The DRX cycle may be adapted to longer or different ON durations if the monitored resources are busy above a certain threshold, e.g., by calculating a Channel Busy Ratio, CBR, on the monitored resources. This may be applied to ensure that there are available resources for a transmission of one or more UEs during the ON duration of the DRX cycle.

Embodiments of the second aspect of the present invention providing via the DRX synchronization information fixed or adaptive length DRX cycles are advantageous because this aspect provides versatility to the UE in order to adapt to its needs at a given point in time and at the same time, maximizes the power saving capability of DRX cycles. While fixed length DRX cycles may be used for UEs that expect only periodic transmissions of a defined packet size, adaptive length DRX cycles enable UEs to change their ON durations as per the situation around them and at the same time, maintain an OFF duration to ensure power saving.

Third Aspect—DRX Alignment

Figure 9:
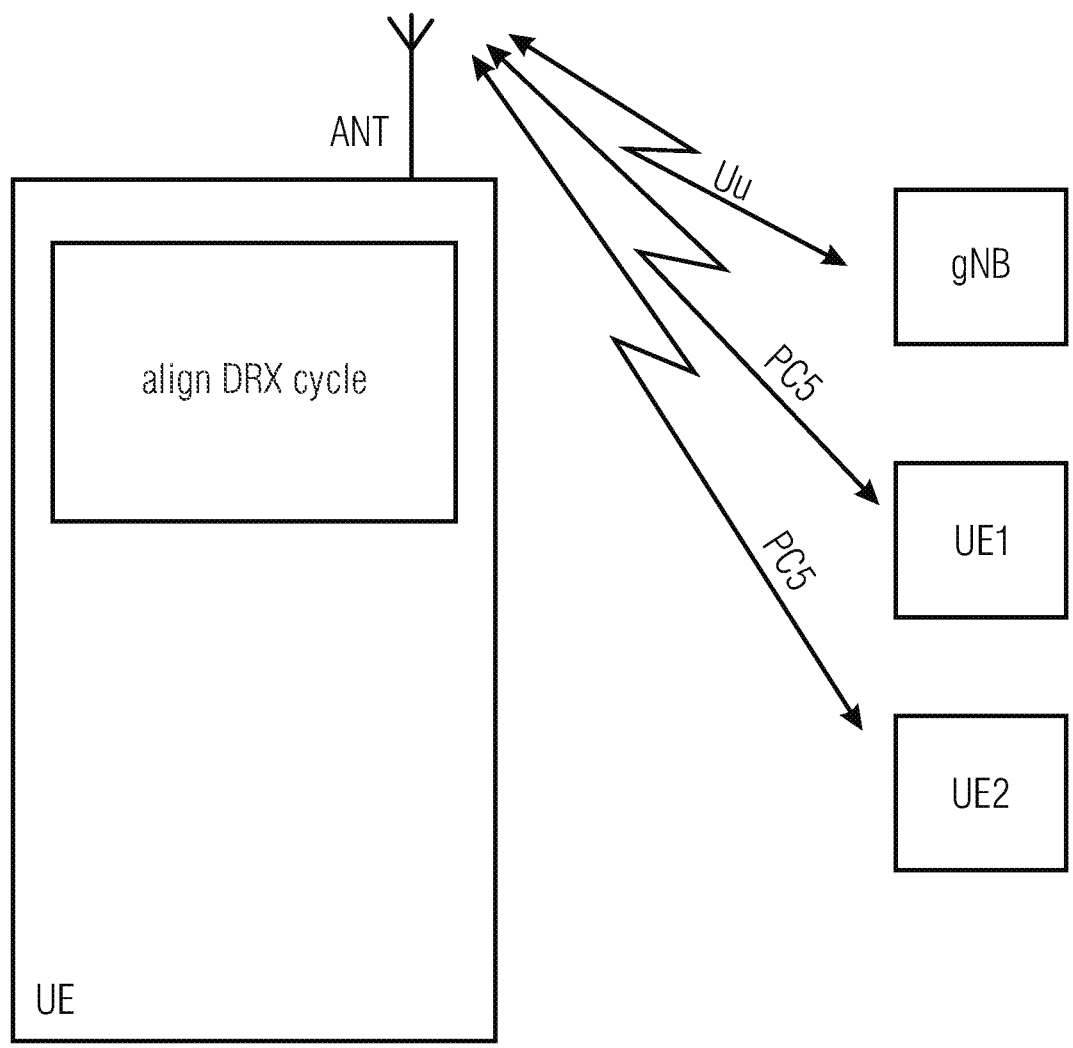
FIG. 9 schematically illustrates a UE in accordance with embodiments of the third aspect of the present invention.

In accordance with embodiments of a third aspect of the present invention, a UE is provided with a DRX configuration that is capable to align with one or more DRX cycles, e.g., the DRX cycle of an access point, like a base station, gNB, or a gateway node, it is connected to, and/or the DRX cycle of one or more UEs it is communicating with over the sidelink. FIG. 9 schematically illustrates a UE in accordance with embodiments of the third aspect of the present invention including an antenna allowing the UE to communicate over the sidelink, like the PC5 interface, with other UEs, like UE1 and UE2. Further, the UE may communicate over the Uu interface with a gNB. For the DRX to be efficient on the sidelink, i.e., for a communication with UE1 and/or UE2, the DRX cycles need to be aligned between the transmitter and the receiver of the respective SL communication so that the transmitter and the receiver may mutually communicate with each other during the respective ON durations and save power during the OFF durations.

The DRX alignment may be between the gNB and the UE, as depicted in FIG. 9, when the UE is operating Mode 1. In such a scenario, the UE receives the DRX configuration from the gNB, for example by an RRC signaling, and due to the connection over the Uu interface, the UE and the gNB are in synchronization with each other. To facilitate the sidelink communication between the UE and the UE1 and/or the UE2, the gNB, in this scenario, provides DCIs to the UEs so that all UEs are in synchronization.

However, in accordance with other embodiments, the UE may be in Mode 2 and communicating over the sidelink with UE1 and UE2 in FIG. 9 without being connected to the gNB. When moving from Mode 2 to Mode 1, i.e., when connecting to the gNB, the UE has its DRX cycle aligned with the UE1 and UE2. Upon moving from Mode 2 to Mode 1 and connecting also to the gNB, the UE may inform the gNB about the one or more DRX cycles existing at the UE. For example, the UE may send DRX cycle information to the gNB via the PUCCH or during the initial access procedure when connecting to the gNB. In accordance with embodiments, once the gNB is informed by the UE about the one or more DRX cycles existing at the UE, the gNB may accept or may not accept that the UE continues to use the one or more currently used DRX cycles. For example the gNB may indicate the acceptance of the currently used DRX cycles by not responding to the UE or by sending an acknowledgement message. On the other hand, the gNB may indicate the non-acceptance of the currently used DRX cycles by sending a new DRX configuration which the UE is expected to use.

In accordance with other embodiments, the alignment of the DRX cycles may be between the SL UEs, for example the UE, the UE1 and the UE2 depicted in FIG. 9. For example, when being in Mode 2, without connecting to a gNB, the alignment may be only between the just-mentioned SL UEs. To be in alignment with the UE1 and the UE2, the UE in FIG. 9 may listen to the UE1 and the UE2 being in the proximity of the UE and adapt to the DRX cycles being used by the other UEs, namely in the UE1 and UE2 in FIG. 9. In case of multiple DRX durations, e.g., the UE1 in FIG. 9 employs a DRX duration being different from the DRX duration employed by the UE2 in FIG. 9, the UE may enable multiple DRX cycles. In accordance with embodiments, for enabling multiple DRX cycles, the UE may create a new DRX pattern formed out of the multiple DRX cycles. For example, if a third UE, UE3, listens to the DRX cycles from UE 1 and UE2, and realizes that the ON durations in a cycle are too long, it doesn't make sense for the UE to switch off for a very short period of time, it may rather remain ON for the entire duration. Instead of listening to multiple DRX cycles, UE3 may create a new DRX pattern than enables it to be ON during the ON durations of both UE1 and UE2, and that defines an OFF duration where the UE may also save power. The final objective of UE3 is to define a DRX cycle that ensures that it may receive from all the relevant UEs around it, and at the same time, achieves a power saving.

Figure 10:
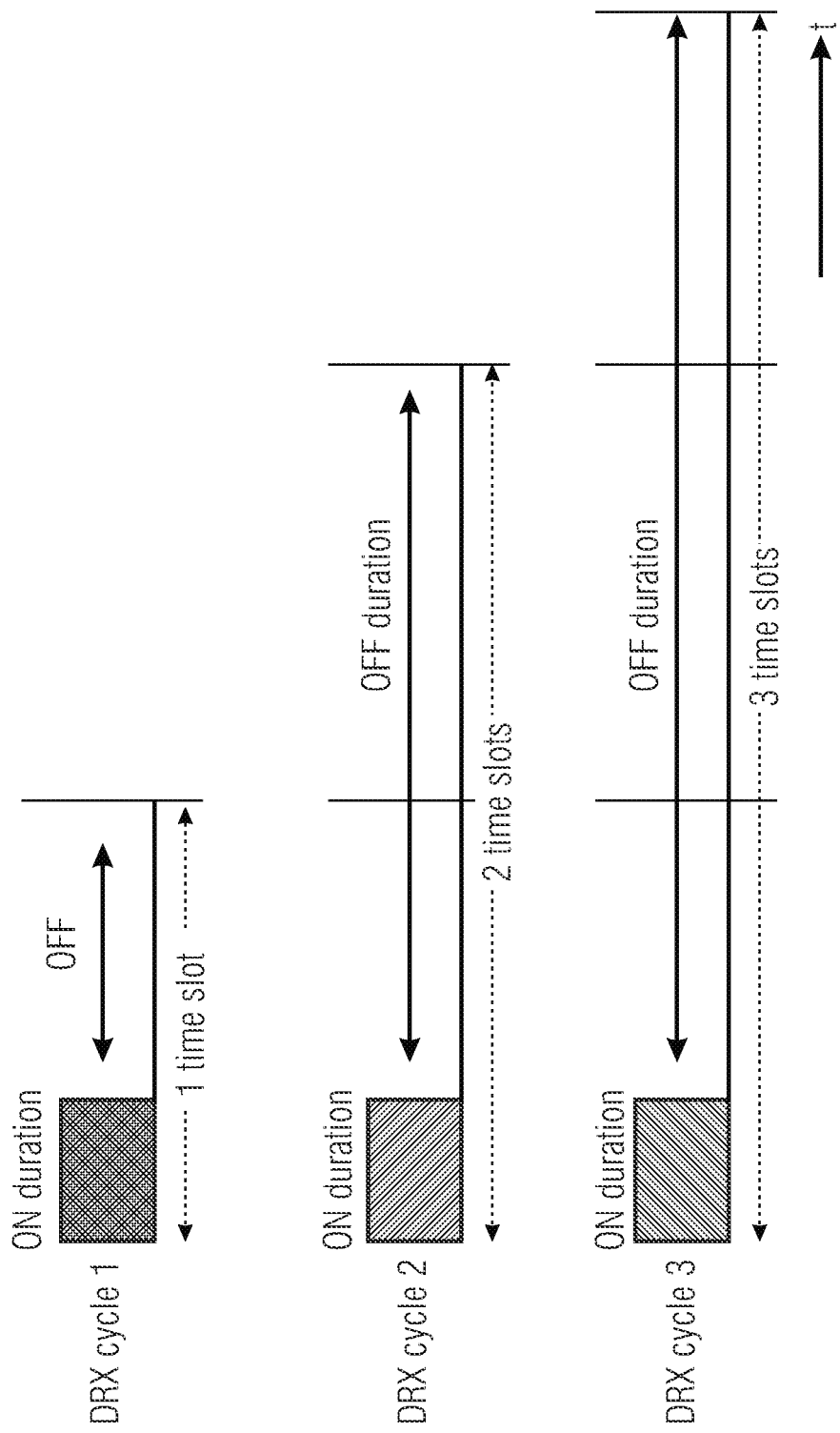
FIG. 10 illustrates an example of three DRX cycles having the same stating time and the same ON durations but different lengths.
Figure 11:
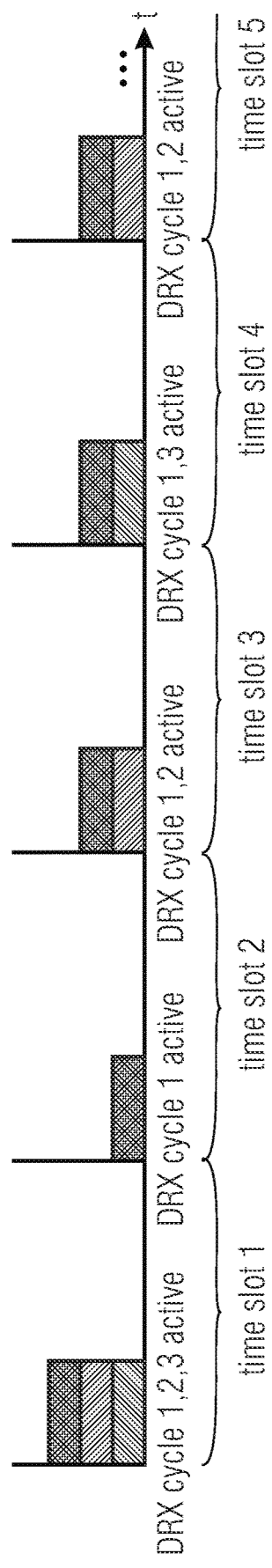
FIG. 11 illustrates the alignment of the DRX cycles of FIG. 10 at a UE in accordance with embodiments of the third aspect of the present invention.

In accordance with embodiments, while different DRX durations may be employed by the UEs communicating over the sidelink, all DRX durations are based on a global starting point and have a set of fixed durations with their respective ON/OFF durations also being defined. For example, three DRX cycles may be defined, as is illustrated in FIG. 10. All DRX cycles have the same global starting point, the same ON durations but different fixed durations, i.e., different OFF durations. DRX cycle 1 has a duration of one time slot, DRX cycle 2 has a duration of two time slots and DRX cycle 3 has a duration of three time slots. For each of the DRX cycles illustrated in FIG. 10, the ON duration is the same, and the ON duration is at the beginning of the DRX cycle at t0. Assuming that the DRX cycles are used by respective UEs to which the UE in FIG. 9 is connected via the sidelink, the UE in FIG. 9 is a single RX UE receiving from the three different TX UEs the respective DRX cycles, and aligns the received DRX cycles in a way as shown in FIG. 11. The three different DRX cycles received from the different TX UEs are aligned so that the start time of all cycles is the same. Thereby the ON times are provided such so the UE is ON to listen to each of the TX UEs. More specifically, as illustrated in FIG. 11, the UE, during each time slot, has an ON duration so that in the first time slot the UE may receive from/transmit to the UE1, the UE2 and the UE3 all of which have their ON duration at the beginning of the first time slot. In the second time slot, the UE also has an ON duration so as to be in a position to transmit to/receive from the UE1 also having at the beginning of the second time slot an ON duration.

At time slot 3, the receiving UE has the ON duration at the beginning of the third time slot so as to receive from/transmit to the UE1 and the UE2, while, at the beginning of the fourth time slot the UE may receive from/transmit to the UE1 and the UE3. At time slot 5, the UE receives from/transmits to the UE1 and the UE2, and so on.

Figure 12A:
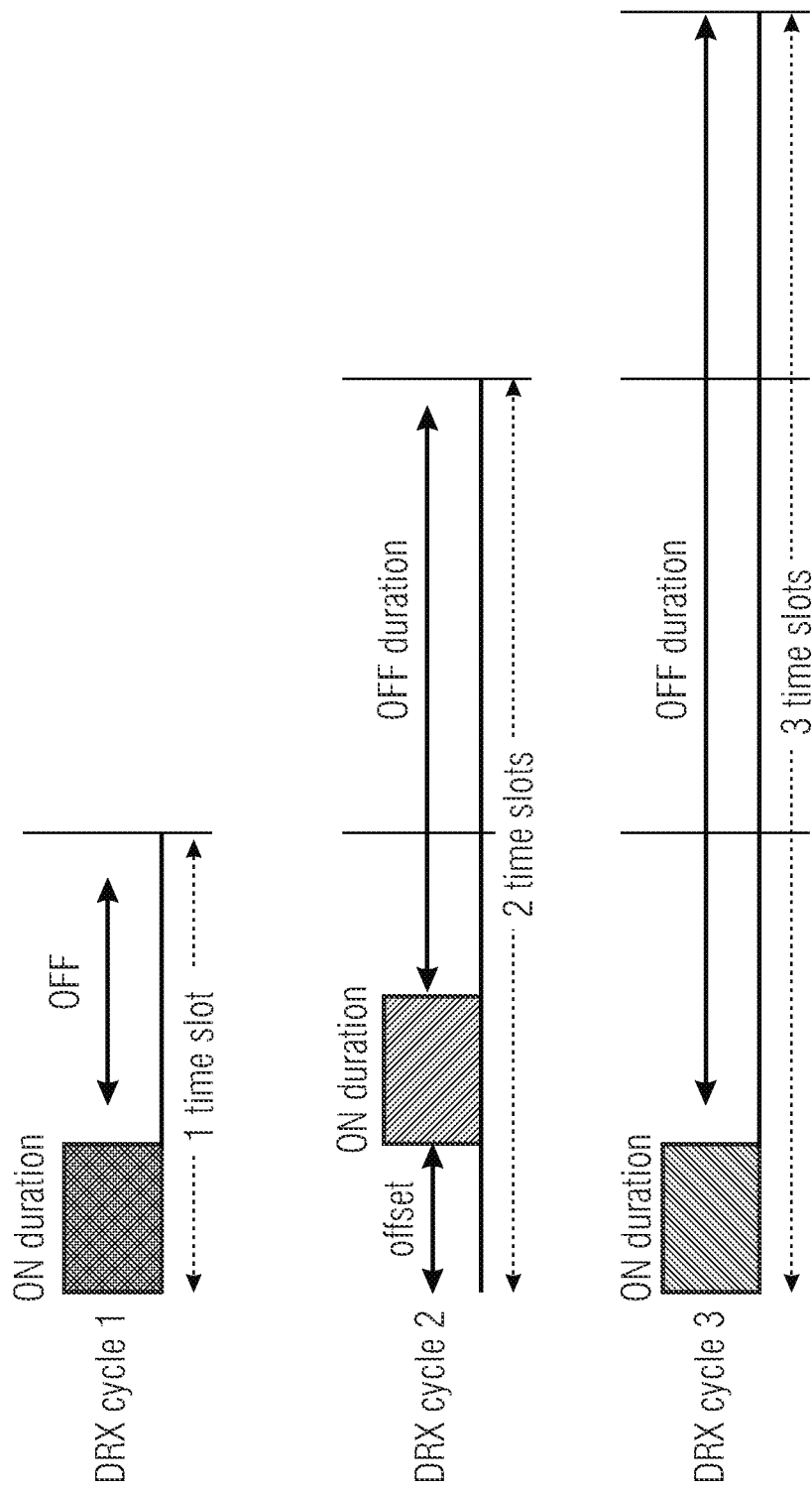
FIG. 12a-b illustrates the consequences of a misalignment of one of the DRX cycles of FIG. 10 at a UE.
Figure 12B:
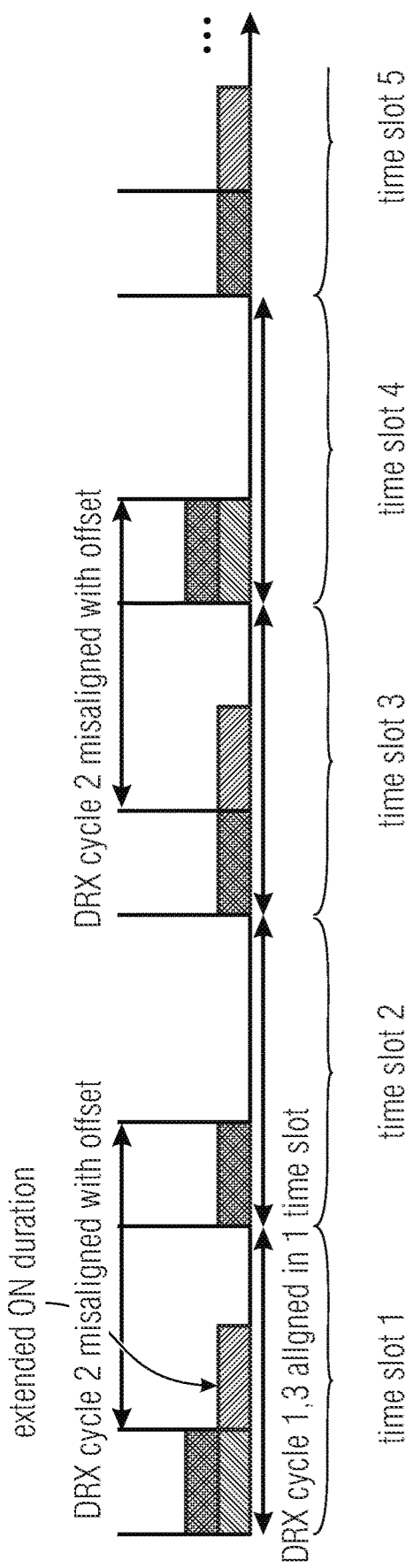

FIG. 12 illustrates the consequences of a misalignment of one DRX cycle by the receiving UE. Again, it is assumed that the UE in FIG. 9 receives from three other UEs, namely UE1, UE2 and UE3 the DRX cycles 1, 2 and 3 as also described above with reference to FIG. 10, however, as is illustrated in FIG. 12(*a*), the UE only aligns DRX cycle 1 and DRX cycle 3 with regard to time to while the DRX cycle 2 is misaligned and has an offset with regard to the time to of the ON duration of the DRX cycle 1 and the DRX cycle 3. This misalignment leads to a situation as illustrated in FIG. 12(*b*) and entails the UE to have an extended ON duration when compared to the case that all DRX cycles are aligned. To enable the UE to receive from/transmit to the UE1, the UE2 and the UE3, the ON duration is twice as long as in the aligned case so that during the first ON duration the UE may receive from/transmit to the UE1 and the UE3, and during the extended ON duration receive from/transmit to the UE2. At time slot 2, since the DRX cycle 2 has a duration of two time slots, the situation is the same as in FIG. 11 in the second time slot. However, in the third time slot, again an extended ON duration is entailed so the UE may receive from/transmit to the first UE during the first part of the ON duration and receive from/transmit to the UE2 during the extended ON duration, as is also the case in time slot 5. Although this problem may be solved by the UE defining a DRX pattern to listen to UE1, 2 and 3, it may be more feasible to simply align the DRX cycles and maximize the OFF duration to increase the power saving gain.

Thus, embodiments of the third aspect of the present invention concerning the DRX alignment in a way as described above are advantageous as by aligning the DRX cycles in a way as described above the ON duration at a receiving UE receiving different DRX cycles from respective UEs it communicates with over the sidelink does not require extended ON durations thereby improving the power savings even when enabling different DRX cycles.

Fourth Aspect—Content of ON Duration of DRX Cycle

In accordance with embodiments of a fourth aspect of the present invention, a sidelink UE operating in accordance with a DRX mode may determine the ON duration of a DRX cycle dependent on the purpose for which the ON duration is to be used by the UE.

Figure 13:
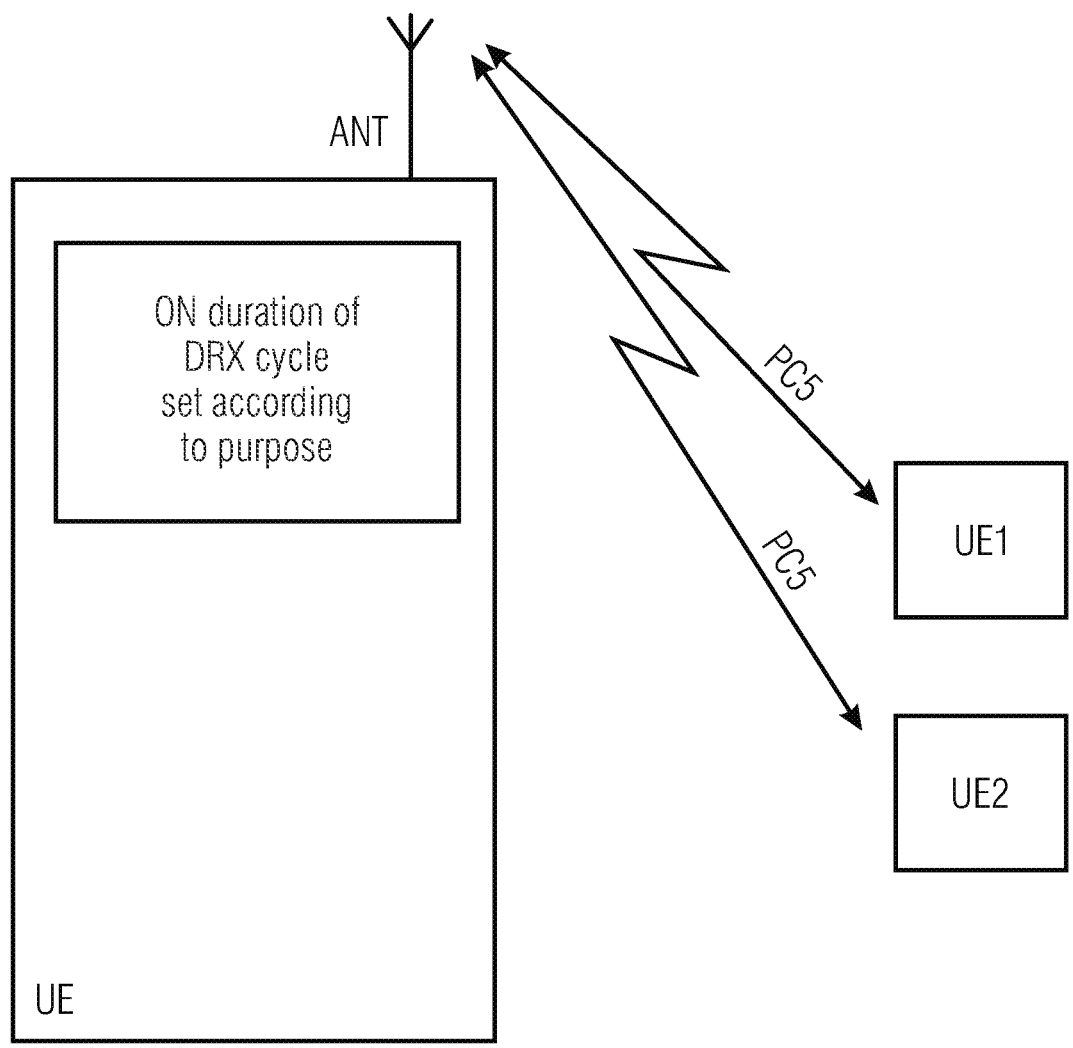
FIG. 13 illustrates an embodiment of a UE in accordance with the fourth aspect of the present invention.

FIG. 13 illustrates an embodiment of a UE in accordance with the fourth aspect of the present invention. The UE includes an antenna ANT for a wireless communication over the sidelink, like the PC5 interface, to one or more UEs, like UE1 and UE2 in FIG. 10. The UE is operating in accordance with the DRX mode and, dependent on a certain purpose, the UE may set the ON duration of the DRX cycle accordingly.

In accordance with embodiments, the UE selects the ON duration dependent on whether the UE is to process (i) only control data, like data in the PSCCH, or (ii) only payload data, like data in the PSSCH, or (iii) only feedback data, like data in the PSFCH, or any combination of two or more (i), (ii) and (iii). For example, the UE may decide to monitor only the PSCCH or the PSCCH+PSSCH or only the PSFCH or the PSCCH+PSSCH+PSFCH depending on its needs. For example, the motivation for monitoring only the PSFCH is that it is very short, and that the UE may only want to check if there are any other unicast-UEs in the cell, to check if the frequency band is busy or empty. It may want to communicate to these UEs emergency messages, so it does not make sense to camp on empty bands.

In accordance with embodiments the ON duration of the DRX cycle may be set dependent on the content of the ON duration, which may vary depending on the purpose for which the UE is using the ON duration. For example, the purpose may be one or more of the following:

the UE is to listen to one or more of the further UEs for the purpose of sensing, the UE is to determine available resources for a transmission, the UE is to transmit control and data, the UE is to listen to the feedback from one or more of the further UEs, the UE is to receive control from one or more of the further UEs, the UE is to determine the load in a given band.

In order to facilitate these purposes, the UE may employ different ON durations for different purposes or situations.

In accordance with embodiments, the UE may signal its ON duration pattern to one or more of the further UEs. The ON pattern may depend on the purpose of the group of UEs, for example, in the case of public safety UEs, the group is expected to listen to only periodic transmissions from other UEs but of varying ON duration lengths. Once a UE within the group, say the GL UE, determines the appropriate ON duration pattern, it signals to the other UEs within the group this pattern, e.g., using assistance messages.

Figure 14:
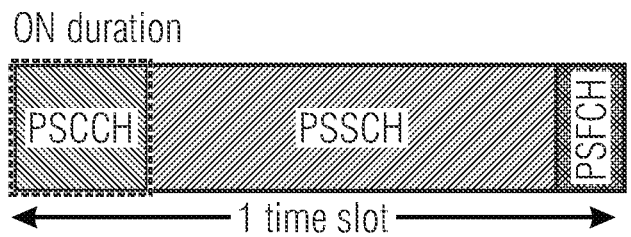
FIG. 14 illustrates an embodiment of an ON duration containing only the PSCCH.

In accordance with embodiments, the ON duration may only cover or contain the PSCCH. FIG. 14 illustrates an embodiment of an ON duration containing only the PSCCH. FIG. 14 illustrates a DRX cycle having a duration of one time slot, however, also longer durations are possible. The ON duration, as is illustrated, only includes the PSCCH, and the PSCCH and the PSFCH are in the OFF duration. Thus, the ON duration spans only the duration of the PSCCH, for example, the first two or three symbols of a time slot. In accordance with embodiments, in the PSCCH a first stage SCI may be transmitted by other UEs, like UE1 or UE2 in FIG. 13 which enables the receiving UE to decode the received SCIs. This may be employed to determine whether resources are available for a transmission or not, for example for the purpose of sensing, like in Mode 2. In accordance with other embodiments, this may also be employed for detecting any pre-emption control message that is intended for the UE.

Figure 15:
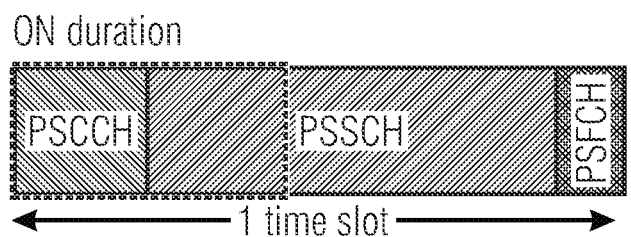
FIG. 15 illustrates the ON duration containing the PSCCH and a part of the PSSCH.

In accordance with other embodiments, the ON duration may include or contain the PSCCH and at least a portion of the PSSCH. FIG. 15 illustrates the ON duration containing the PSCCH and a part of the PSSCH. Again, an overall duration of the DRX cycle of one time slot is assumed, but again, longer duration is also possible. The ON duration is illustrated in FIG. 15 to include the PSCCH and about ⅓ of the PSSCH. Dependent on the circumstances, the portion of the ON duration covering the PSCCH may be longer or shorter. The ON duration spanning the control and part of the data channels may be employed by the UE to carry out its own transmission. For example, the UE may be enabled to transmit a first stage SCI in the PSCCH to the other UEs, like UE1 and UE2 in FIG. 13, followed by the PSSCH part, which may contain the second stage SCI and the data. In accordance with other embodiments, this ON duration may be used to allow the UE to listen to the first and second stage control information, which are transmitted respectively in the PSCCH and PSSCH.

Figure 16:
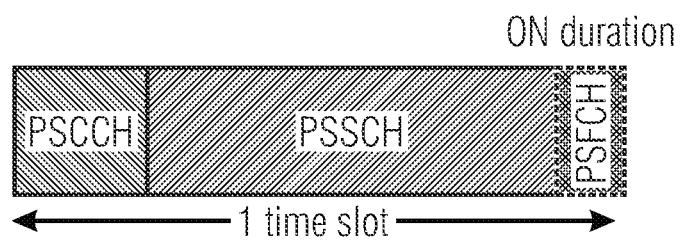
FIG. 16 illustrates the ON duration including or containing only the PSFCH.

In accordance with yet other embodiments, the ON duration may only cover the PSFCH, the physical sidelink feedback channel. FIG. 16 illustrates the ON duration including or containing only the PSFCH. Again, a cycle length of one time slot is assumed, however, a longer cycle is also possible. As is illustrated, the ON duration only contains the PSFCH. In accordance with embodiments, this may be employed when the UE realizes that a time slot is occupied by more than one further UEs, for example both the UE1 and UE2 in FIG. 13. Among the available sub-channels, the UE needs to determine which sub-channel is available for a transmission, which may be deduced to listening to the PSFCH only because the sub-channels within the PSFCH are implicitly mapped to corresponding sub-channels in the PSFCH. The advantage of this embodiment is that instead of staying on longer to listen to the PSSCH, the UE may infer the same information by listening to the PSFCH which entails staying on for a duration substantially shorter than the duration of the PSSCH, as may be seen from FIG. 16. However, this aspect may be viable only on resource pools with the PSFCH enabled.

Figure 17:
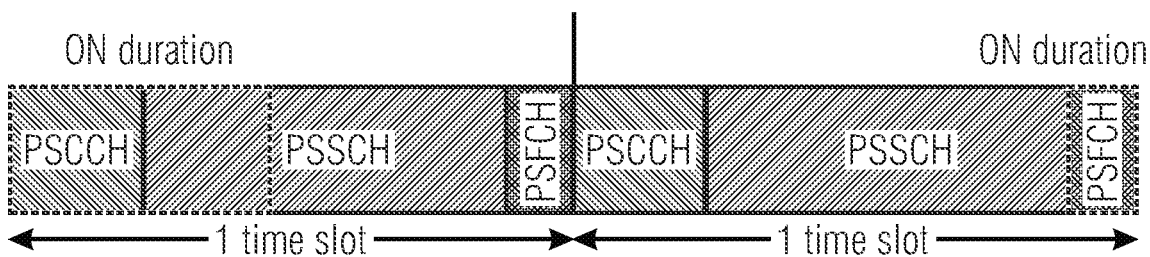
FIG. 17 illustrates the ON duration containing the PSCCH, a part of the PSSCH and the PSFCH.

In accordance with yet other embodiments, the ON duration may include a combination of the PSCCH, at least a part of the PSSCH and the PSFCH. FIG. 17 illustrates the ON duration containing the PSCCH, a part of the PSSCH and the PSFCH. In FIG. 17 the cycle length is two time slots, and the ON duration may be such that in a first time slot the PSCCH and a part of the PSFCH are covered by the ON duration, while the PSFCH of a subsequent time slot is covered by the ON duration. In accordance with embodiments, this combination may be employed when the amount of data the UE data to transmit is limited, i.e., for which not the entire PSSCH is needed. To optimize the OFF duration for saving power the UE may employ the discontinuous ON duration as depicted in FIG. 17 within a time slot, where the UE is ON for the PSCCH and a portion of the PSSCH, followed by being ON again in a subsequent time slot, either the same time slot or a subsequent time slot during the PSFCH to receive the feedback.

Embodiments of the fourth aspect of the present invention defining the duration of the ON period of the DRX cycle dependent on the purpose for which the ON duration is to be used are advantageous because the UE may maximize its power saving ability based on its specific needs.

Fifth Aspect—DRX Signaling Procedure

Figure 18:
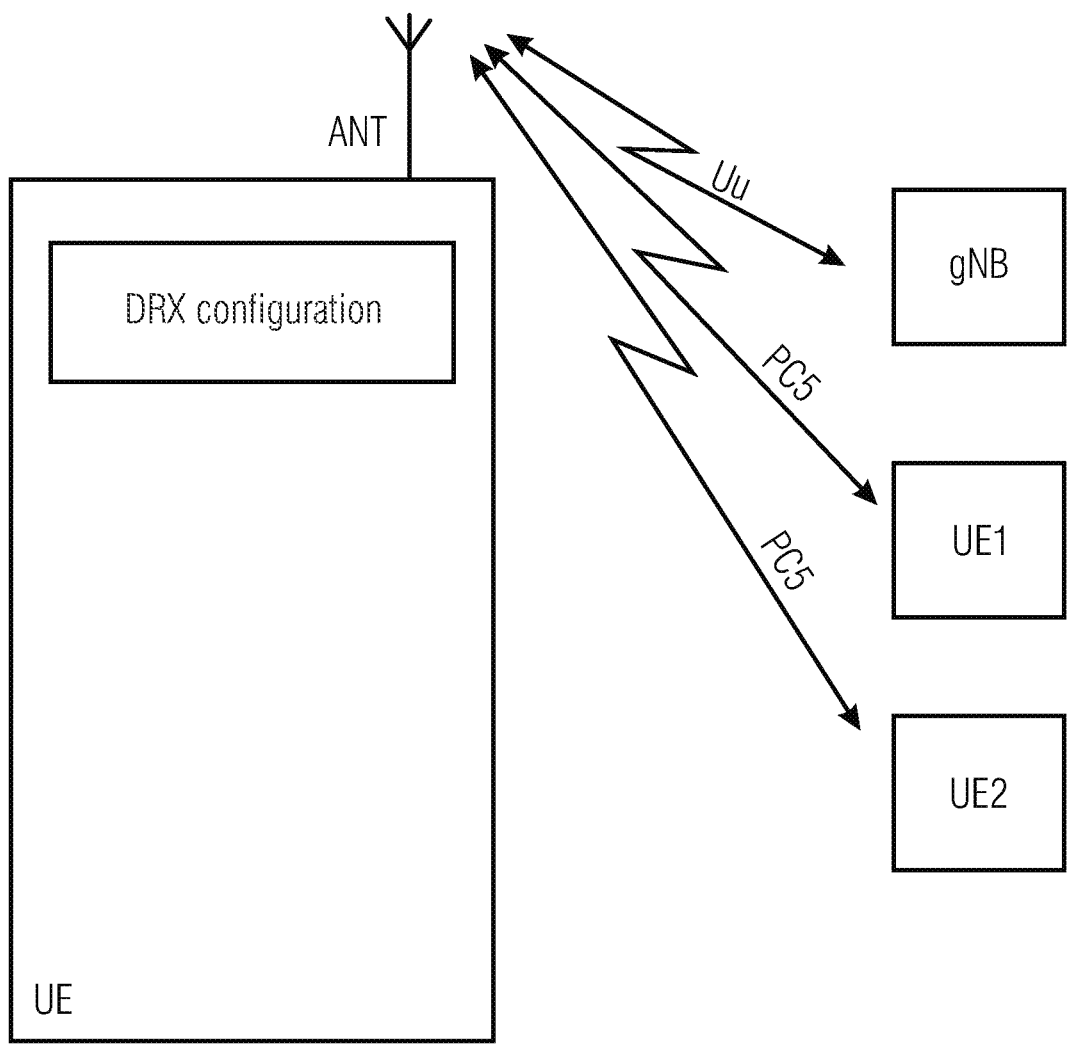
FIG. 18 illustrates a UE in accordance with embodiments of the fifth aspect of the present invention.

In accordance with embodiments of the fifth aspect of the present invention, one or more DRX signaling procedures are provided. FIG. 18 illustrates a UE in accordance with embodiments of the fifth aspect of the present invention including an antenna and being capable to communicate with a gNB over a Uu interface and with respective other UEs, UE1 and UE2, over the sidelink interface, like the PC5 interface. To operate in the DRX mode, the UE is to receive one or more DRX configurations from a DRX synchronization source, which may be the gNB, the UE1 or the UE2 in FIG. 18. In case the DRX synchronization source is the gNB, the UE is to receive from the base station a control message, e.g., the system information block, SIB, including the one or more DRX configurations. In case the DRX synchronization source is one or more of the UEs for the sidelink communication, like UE1 and UE2 in FIG. 18, the UE is to receive from the UE1 and/or from the UE2 the DRX configurations using, for example, a PC5 RRC signaling or a SCI, like a second stage SCI, for a given transmission. In accordance with embodiments, the synchronization sources in FIG. 18, the gNB, the UE1 and the UE2, may be ranked in a way as described above with reference to the first aspect of the present invention and is explained with reference to FIG. 7.

Thus, in accordance with the fifth aspect of the present invention, for the DRX mode on the sidelink to be enabled in a UE, the UE needs to receive the DRX configuration or DRX configuration information from a DRX synchronization source, for example a source as described above with reference to the first aspect of the present invention, and once the UE has the DRX configuration, in accordance with embodiments, the activation of the DRX mode may be done by an additional signaling.

In accordance with embodiments, the gNB may signal to the SL UE one or more DRX configurations, for example using RRC configurations. The DRX configuration may be transmitted using a SIB, along with a resource pool configuration indicating the resources provided by the gNB for the sidelink communication. The UE may receive the DRX configuration when operating in Mode 1 or in Mode 2, as long as the UE is within coverage of the gNB.

In accordance with other embodiments, a UE may receive the DRX communication from another UE via the sidelink, for example, when the UE is out of coverage of a gNB. The UE may receive the DRX configuration from another SL UE over the sidelink via a PC5 RRC signaling. The DRX configuration may be a global configuration to be used for any transmission when the DRX mode is active. The UE may receive the DRX configuration using a second stage SCI for a certain transmission. In such an embodiment, the UE may receive an indication of the second stage format in a first stage SCI so that the receiving UE is aware that a transmission from a transmitting SL UE entails the use of a DRX configuration that is provided in the second stage SCI.

In accordance with embodiments, the DRX configuration may include one or more of the following information:
- a DRX cycle duration—the overall duration of a single DRX cycle including the ON and OFF durations,
- an ON duration—the duration during which a UE may transmit and receive,
- an inactivity timer—the duration a UE has to remain ON after receipt of a control signal and/or a transmission of a packet, for example, for waiting for the HARQ feedback so that when the timer expired, the UE may return to the OFF duration,
- a retransmission timer—the time duration a UE has to remain ON because the control signal indicates retransmissions for a given packet,
- a minimum communication range—the range within which the UE is to expect or transmit feedback regarding a transmission transmitted or received.

In accordance with embodiments, the DRX configurations may be signaled to a UE over the sidelink using a sidelink DRX configuration element as depicted in FIG. 19(a). FIG. 19(b) is a table including a description of the fields of the SL DRX configuration information element of FIG. 19(a).

In accordance with further embodiments, the DRX configuration obtained at a UE, like the UE in FIG. 18, either from the gNB or from another SL UE, like UE1 and UE2, may not be initially used, rather, the UE may use the DRX mode only once it is activated. In accordance with embodiments, the DRX mode may be activated by
- the lapse of an inactivity timer, or
- an explicit signaling from another SL UE, like UE1 or UE2 in FIG. 18, or
- enabling a HARQ process at the UE, or
- a switch to a reception only mode, or
- a higher layer signaling to conserve power, or
- a change in QoS, or
- the UE being in a certain geographical location.

In case the inactivity timer is employed, once this timer lapsed, the UE switches to the OFF duration when it realizes that there are no incoming transmissions that it is to expect to receive and in case no further transmissions are planned by the UE. This may be achieved once the UE has been idle for a predefined time period and once the time as defined by the inactivity timer elapsed.

In accordance with other embodiments, the UE may receive an explicit signaling for activating or deactivating the DRX mode. For example, a transmitting or TX UE, like UE1 or UE2 in FIG. 18, may signal to the receiving or RX UE, like the UE in FIG. 18, that it has a transmission that is longer than the configured DRX ON duration. This entails the RX UE to remain ON for a longer time duration so that the DRX mode may be deactivated. In accordance with embodiments, the explicit signaling may be carried out as follows:
- using one or more dedicated fields in the SC, e.g., SCI in a sidelink, 1$^{st}$ stage SCI, 2$^{nd}$ SCI stage, etc., pertaining to a given transmission, with additional information indicating a duration of the DRX activation or deactivation, or
- using a "Resource Reservation Field" in the SCI indicating the presence of further transmissions during which the UE is to remain ON in order to receive these transmissions, or
- using the "Priority Field" in the SCI to indicate a packet delay budget, PDB, associated with a transmission during which the UE receiving the transmission has to remain ON in order to receive any further retransmissions or HARQ retransmissions.

In accordance with further embodiments, the activation of the DRX mode may be responsive to the enablement of a HARQ process. For example, when only NACK is enabled, the UE, when receiving data, the UE stays ON until successfully receiving the transmission, or, when transmitting data, stays ON for a time duration for receiving the NACK. When both ACK and NACK are enabled, the UE, when receiving data, stays ON until successfully receiving the transmissions, or, when transmitting data, the UE stays ON for a time duration for receiving the ACK or the NACK.

Figure 20:
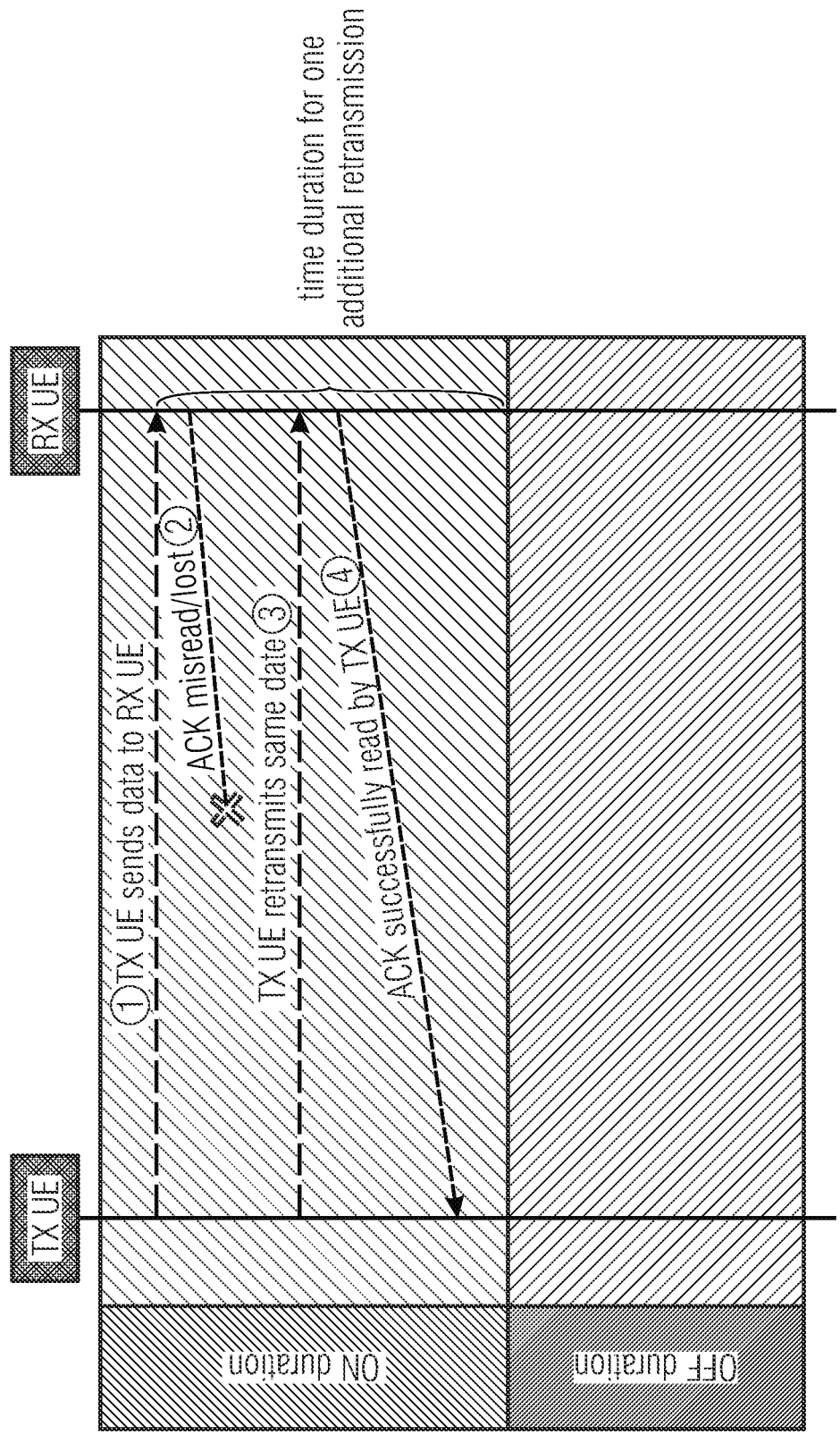
FIG. 20 illustrates an embodiment for an ON duration to enable the receiving UE to obtain a retransmission in case of a missed acknowledgement message.

FIG. 20 illustrates an embodiment for an ON duration to enable the receiving UE to obtain a retransmission in case of a missed acknowledgement message, namely the ON duration plus a duration for one additional transmission. The TX UE sends ① data to the RX UE which transmits ② an acknowledgement message to the TX UE. In case the acknowledgement is not received at the TX UE, the TX UE assumes a non-successful transmission and retransmits ③ the data so that the RX UE may send the acknowledgement again, which is then, in the depicted embodiment, successfully read ④ at the TX UE. The ON duration at the RX UE, in accordance with this embodiment, is selected such that a sufficient time for at least one additional retransmission is covered so the RX UE, despite the successful receipt of the data at the first time, may read a further retransmission. In accordance with embodiments, this may be realized by a HARQ timer being enabled when a HARQ transmission is received and which defines a time window in which a UE expects a retransmission before switching from the ON duration to the OFF duration or before starting the inactivity timer. In accordance with another embodiment, the inactivity timer may be set to be at least a certain number of HARQ round transmission times, RTTs, for example to be one or two HARQ RTTs so that the TX UE may finish a transmission within the extended ON duration.

In accordance with yet further embodiments, the time duration for the retransmission may depend on the minimum communication range. When the UE is within the minimum communication range, an appropriate time duration may be set, e.g., in a way as described above, so that the UE, when receiving transmissions, stays on to receive a retransmission, or, when transmitting, performs the retransmission. On the other hand, when the UE is outside the minimum communication range the time duration for the retransmission may be set to zero as the UE no longer expects to receive a retransmission or does not perform a retransmission because of the distance to the sender/receiver.

In accordance with yet further embodiments, the UE may be expected to activate or deactivate the DRX configuration based on its location. If the UE is within a pre-defined geographical zone where it is expected to receive only periodic transmissions, it may activate the DRX configuration accordingly. When a UE is used to transmit/receive high QoS transmissions, it may deactivate the DRX configuration in order to meet the high QoS demands. Alternatively, it may activate the DRX configuration when the transmissions are of low QoS and power saving takes a higher priority for the UE. For example, when the UE is running low on power or battery, it may choose to receive only transmissions of a certain QoS based on a DRX configuration so as to save power.

In accordance with further embodiments of the fifth aspect, a UE may receive, as explained above with reference to FIG. 18, DRX configurations from different sources, for example, from the gNB, the UE1 and the UE2. In accordance with embodiments in which some or all of the DRX configuration sources may have the same rank situations may occur where multiple DRX configurations are received at the UE having different start times and durations. When receiving such DRX configurations with different start times and durations, the UE is not able to maintain these multiple DRX configurations. Only in case the start times are the same and the durations are multiples of each other, the UE may handle the different configurations and set the ON duration and OFF duration to be employed by the UE, like UE in FIG. 18 accordingly, e.g., in a way as described above with reference to the third aspect.

In case of conflicting DRX configurations with different start times and/or durations not being multiples of each other, the UE is not able to maintain these multiple DRX configurations. Embodiments of the fifth aspect of the present invention provide a solution to such a conflict, assuming that the different sources for the DRX configurations have different ranks. Therefore, in accordance with embodiments, in case of receiving multiple different DRX configurations the UE may select the DRX configuration from the DRX configuration source having the highest hierarchal rank, as explained above with regard to the first aspect of the present invention. For example, when the highest source is a gNB or a base/lead UE, in accordance with embodiments, the UE may send assistance information to one or more of the other DRX configuration sources, which may be another UE, informing the other UE about the presence of a hierarchal source. For example, when considering FIG. 18 and assuming that the gNB, the UE1 and the UE2 provided conflicting DRX configurations to the UE, the UE, in view of the highest rank being associated with the gNB selects the DRX configuration as provided by a gNB and informs the UE1 and/or the UE2 about this higher rank configuration, for example, using assistance information. The UE1 and the UE2 may then align the timing of their DRX configuration with the DRX configuration of the gNB. This process may be repeated so as to achieve a common start time and durations to be multiples of each so as to achieve a synchronous system.

The above-mentioned assistance information may be used to provide from a UE to a receiving UE, for example from the UE to UE1 or UE2 in FIG. 18 information to alter the characteristics of the DRX cycle for achieving a synchronous system as described above. The characteristics of a DRX cycle may include one or more of a duration of the DRX cycle length, e.g., by maintaining the ON duration and reducing the OFF duration, an offset of the DRX cycle to match a start time, an ON duration of the DRX cycle. In accordance with embodiments, the assistance information may cause the ON duration of a certain DRX configuration to remain the same while the OFF duration may be increased or decreased so as to match the reference DRX configuration, i.e., the DRX configuration selected by the UE for example from the highest hierarchal DRX configuration source as described above.

This may be applicable to both long and short DRX cycle lengths. In case of long DRX cycle lengths, the increment or decrement may be in the order of +/− milliseconds, and in the case of short DRX cycles, the increment of decrement may be in the order to +/−1/32 of a millisecond.

Figure 21:
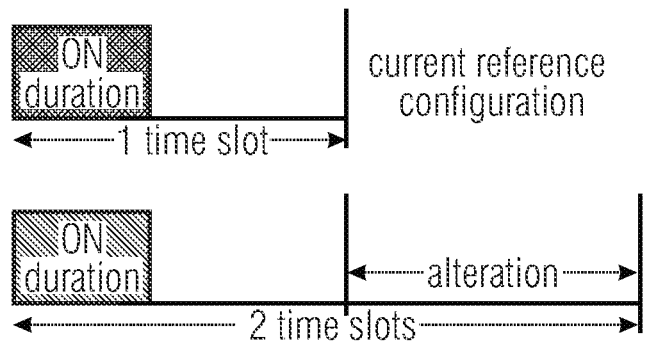
FIG. 21 illustrates an embodiment of assistance information provided to alter a DRX cycle length.
Figure 22:
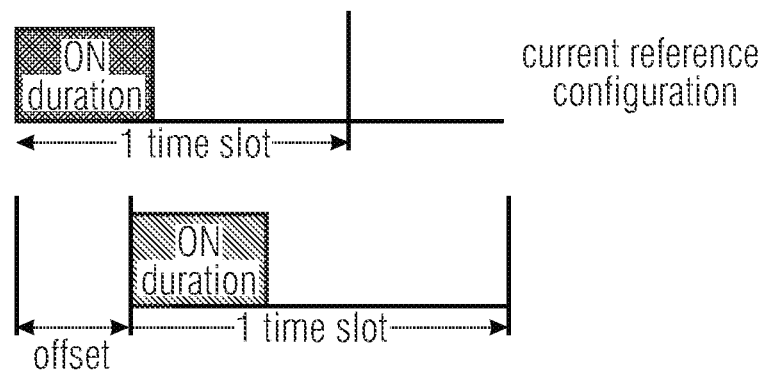
FIG. 22 illustrates an embodiment of assistance information provided to alter a start time of the DRX cycle.

FIG. 21 illustrates an embodiment of assistance information provided to alter a DRX cycle length in accordance with a first type, type 1. FIG. 21 illustrates in the upper part the current reference DRX configuration, and in the lower part the conflicting DRX configuration which is altered by making the cycle length shorter by the "alteration" indicated in FIG. 21 thereby adapting the conflicting DRX configuration to the reference configuration The assistance information may also provide information to align a start time, for example by pushing the entire DRX cycle by given offset, as is illustrated in FIG. 22 illustrating in the upper part a current reference configuration and in the lower part a conflicting DRX configuration. In accordance with FIG. 20, the UE assistance information indicates an offset DRX cycle (type 2) moving the start of the DRX cycle by the offset so as to match the starting time of the reference DRX configuration.

Figure 23:
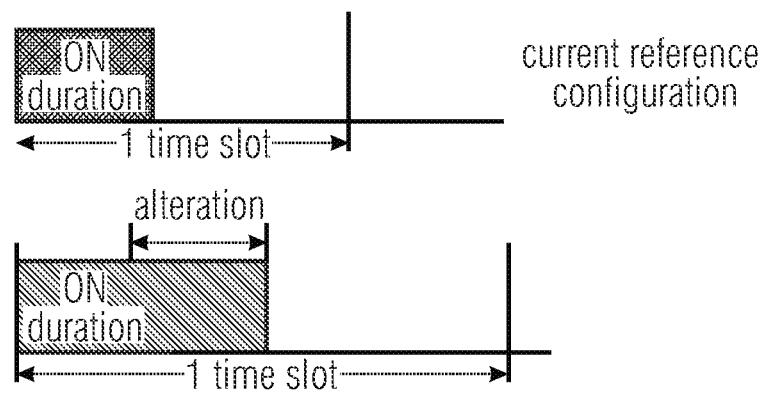
FIG. 23 illustrates an embodiment of assistance information provided to alter a length of the DRX ON duration.

In accordance with further embodiments, the UE may provide another UE, like UE1 in FIG. 18, with information so as to alter the ON duration of a defined DRX cycle from another source so as to align them, as is depicted in FIG. 23 illustrating UE assistance information to alter the ON duration (type 3). FIG. 23, again, illustrates in the upper part the current reference DRX configuration, and in the lower part the conflicting DRX configuration which is altered by making the ON duration shorter by the "alteration" indicated in FIG. 23 thereby adapting the conflicting DRX configuration to the reference configuration.

The above-mentioned assistance information may be signaled by the UE to the UE1 or to the UE2 in FIG. 18 using an assistance information IE, and FIG. 24(a) shows such an assistance information IE in accordance with an embodiment of the fifth aspect of the present invention, in accordance with which type 1 alters the DRX cycle length, type 2 causes an offset of the DRX cycle, and type 3 alters the ON duration. FIG. 24(b) illustrates the delay budget report information element transmitted by the UE as part of the assistance information and including the values in number of milliseconds, namely msXX or msMinusXX indicating the increase or decrease of the DRX cycle length desired by the UE.

Sixth Aspect—Non-DRX-UE Avoids ON Duration Resources

Figure 25:
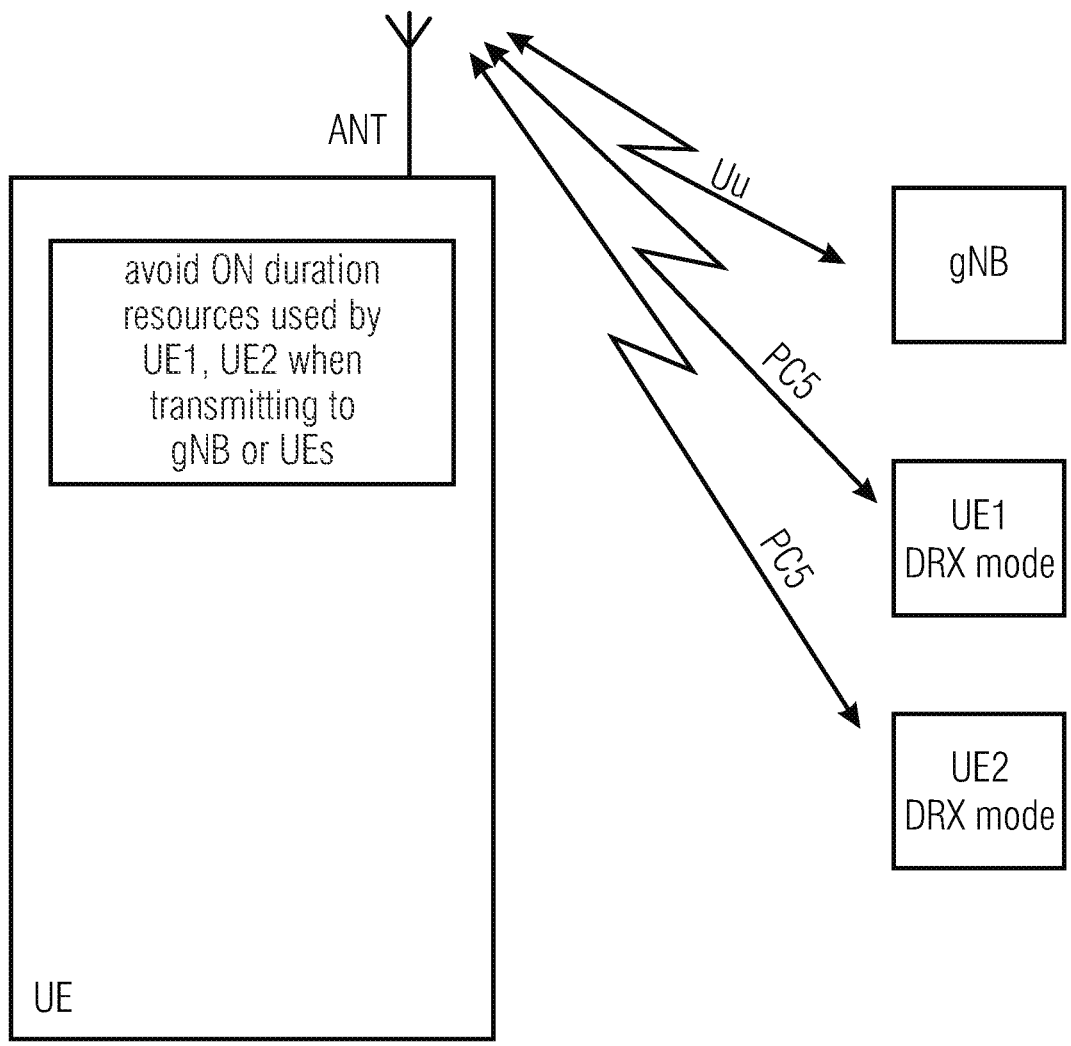
FIG. 25 illustrates a UE in accordance with embodiments of the sixth aspect of the present invention.

In accordance with embodiments of the sixth aspect of the present invention, the use of ON Duration Resources to be used in DRX mode is avoided by other UEs, e.g., UEs not operating in the DRX mode. FIG. 25 illustrates a UE in accordance with embodiments of the sixth aspect of the present invention including an antenna and being capable to communicate with a gNB over a Uu interface and with respective other UEs, UE1 and UE2, over the sidelink interface, like the PC5 interface. The UE may be a V-UE so that there is no need for the US to operate in the DRX. However, the UE is aware of one or more of the further UEs, like UE1, UE2, operating in the DRX mode. The UE avoids resources for a transmission that are used by a further UE during its ON duration.

In accordance with embodiments, the UE, when transmitting on the SL, may avoid resources used by a further UE during the ON duration of the further UE by excluding resources that occur within the ON duration, or by adding a penalty for using resources that occur within the ON duration, or by using resources that occur within the ON duration only when no other resource is available. The penalty may be in the form of an RSRP/RSSI penalty or sensing penalty that is added to the actual RSRP/RSSI value measured in the resources within the ON duration, so as to discourage the UE to select these resources. The penalty causes these resources to be less likely to be selected from the entire set of available resources since they are down-ranked after the addition of the penalty.

In accordance with embodiments, a restriction penalty may be applied, e.g., resources may only be used for transmissions above a certain priority. In accordance with yet other embodiments, a selection penalty may be applied so that one or more certain resources are less likely to be selected, e.g., because they are down ranked after sensing. The selection penalty may be based on a number of UEs using the certain resource during their ON durations, e.g., the more UEs use the certain resource the less likely is it selected.

General Embodiments of the present invention have been described in detail above, and the respective embodiments and aspects may be implemented individually or two or more of the embodiments or aspects may be implemented in combination.

In accordance with embodiments, the wireless communication system may include a terrestrial network, or a non-terrestrial network, or networks or segments of networks using as a receiver an airborne vehicle or a spaceborne vehicle, or a combination thereof.

In accordance with embodiments, the user device, UE, described herein may be one or more of a power-limited UE, or a hand-held UE, like a UE used by a pedestrian, and referred to as a Vulnerable Road User, VRU, or a Pedestrian UE, P-UE, or an on-body or hand-held UE used by public safety personnel and first responders, and referred to as Public safety UE, PS-UE, or an IoT UE, e.g., a sensor, an actuator or a UE provided in a campus network to carry out repetitive tasks and entailing input from a gateway node at periodic intervals, or a mobile terminal, or a stationary terminal, or a cellular IoT-UE, or a vehicular UE, or a vehicular group leader (GL) UE, or an IoT, or a narrowband IoT, NB-IoT, device, or a WiFi non Access Point STAtion, non-AP STA, e.g., 802.11ax or 802.11be, or a ground based vehicle, or an aerial vehicle, or a drone, or a moving base station, or a road side unit, or a building, or any other item or device provided with network connectivity enabling the item/device to communicate using the wireless communication network, e.g., a sensor or actuator, or any other item or device provided with network connectivity enabling the item/device to communicate using a sidelink the wireless communication network, e.g., a sensor or actuator, or any sidelink capable network entity.

The base station, BS, described herein may be implemented as mobile or immobile base station and may be one or more of a macro cell base station, or a small cell base station, or a central unit of a base station, or a distributed unit of a base station, or a road side unit, or a UE, or a group leader (GL), or a relay, or a remote radio head, or an AMF, or an SMF, or a core network entity, or mobile edge computing entity, or a network slice as in the NR or 5G core context, or a WiFi AP STA, e.g., 802.11ax or 802.11be, or any transmission/reception point, TRP, enabling an item or a device to communicate using the wireless communication network, the item or device being provided with network connectivity to communicate using the wireless communication network.

Embodiments of the inventive approach are described for sidelink communications in the context of cellular communication systems, safety communication systems, campus networks. The present invention is not limited to this, rather, in accordance with further embodiments, the inventive approach may be employed in any kind of communication network, e.g. an ad-hoc communication network.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 26 illustrates an example of a computer system 500. The units or modules as well as the steps of the methods performed by these units may execute on one or more computer systems 500. The computer system 500 includes one or more processors 502, like a special purpose or a general-purpose digital signal processor. The processor 502 is connected to a communication infrastructure 504, like a bus or a network. The computer system 500 includes a main memory 506, e.g., a random-access memory (RAM), and a secondary memory 508, e.g., a hard disk drive and/or a removable storage drive. The secondary memory 508 may allow computer programs or other instructions to be loaded into the computer system 500. The computer system 500 may further include a communications interface 510 to allow software and data to be transferred between computer system 500 and external devices. The communication may be in the from electronic, electromagnetic, optical, or other signals capable of being handled by a communications interface. The communication may use a wire or a cable, fiber optics, a phone line, a cellular phone link, an RF link and other communications channels 512.

The terms "computer program medium" and "computer readable medium" are used to generally refer to tangible storage media such as removable storage units or a hard disk installed in a hard disk drive. These computer program products are means for providing software to the computer system 500. The computer programs, also referred to as computer control logic, are stored in main memory 506 and/or secondary memory 508. Computer programs may also be received via the communications interface 510. The computer program, when executed, enables the computer system 500 to implement the present invention. In particular, the computer program, when executed, enables processor 502 to implement the processes of the present invention, such as any of the methods described herein. Accordingly, such a computer program may represent a controller of the computer system 500. Where the disclosure is implemented using software, the software may be stored in a computer program product and loaded into computer system 500 using a removable storage drive, an interface, like communications interface 510.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A user device, UE, for a wireless communication system, the wireless communication system comprising a plurality of user devices, UEs,
   wherein the UE is to communicate with one or more further UEs using a sidelink, SL,
   wherein, to operate in a Discontinuous Reception, DRX, mode, the UE is to receive a DRX configuration from one of a plurality of DRX configuration sources, and
   wherein the plurality of DRX configuration sources are ranked such that each of the DRX configuration sources among the plurality of DRX configuration sources comprises a rank different from each of the other DRX configuration sources among the plurality of DRX configuration sources, and the UE is to select the DRX configuration from the DRX configuration source comprising the highest rank among the available DRX configuration sources.

2. The user device, UE, of claim 1, wherein the UE is to determine from the plurality of DRX configuration sources the available DRX configuration sources to which the UE is capable to connect,
   determine from the available DRX configuration sources the available DRX configuration source comprising the highest rank, and
   select the DRX configuration from the available DRX configuration source comprising the highest rank.

3. The user device, UE, of claim 1, wherein the plurality of DRX configuration sources are ranked based on one or more of the following:
   an interface connecting a DRX configuration source to a user device,
   a type of the DRX configuration source,
   a certain parameter comprised in a DRX configuration received from the DRX configuration source.

4. The user device, UE, of claim 1, wherein the plurality of DRX configuration sources comprises one or more of:
   an access point, like a base station, gNB, or a gateway node, of the wireless communication system, the access point comprising a rank,
   one or more first UEs authorized by the wireless communication system to transmit a DRX configuration or to coordinate the DRX, the first UEs comprising the same ranks or different ranks lower than the rank of the access point,
   one or more second UEs to which the UE is connected for a communication over the SL, the second UEs comprising the same ranks or different ranks lower than the one or more ranks of the first UEs,
   one or more third UEs transmitting on SL resources of the wireless communication system assistance information, the assistance information comprising one or more DRX configurations, the third UEs comprising the same ranks or different ranks lower than the one or more ranks of the second UEs,
   one or more fourth UEs operating in the DRX mode and transmitting on SL resources of the wireless communication system and from which the UE acquires a DRX configuration by listening to a DRX cycle used at the fourth UEs, the fourth UEs comprising the same ranks or different ranks lower than the one or more ranks of the third UEs.

5. The user device, UE, of claim 1, wherein, in case the UE is connected to a certain DRX configuration source, the UE is to limit the available DRX configuration sources to those available DRX configuration sources comprising the same or a higher rank than the certain DRX configuration source.

6. The user device, UE, of claim 5, wherein the certain DRX configuration source comprises a base station comprising the highest rank, and the UE is to limit the available DRX configuration sources to the base station.

7. The user device, UE, of claim 1,
   wherein the UE is to align the DRX cycles with an access point, like a base station, gNB, or a gateway node, of the wireless communication system and/or one or more of the further UEs.

8. The user device, UE, of claim 7, wherein, to align a DRX cycle between the UE and a base station, in case the UE is connected to the base station, the UE has its DRX cycle aligned with the base station, responsive to being configured by the base station with one or more DRX configurations, and/or in case the UE has its DRX cycle aligned with one or more of the further UEs it is connected to for the SL communication, the UE is to signal to the base station one or more of its existing DRX cycles in order to inform the base station.

9. The user device, UE, of claim 7, wherein, to align a DRX cycle between the UE and one or more of the further UEs, the UE is to listen to one or more of the further UEs being in proximity of the UE, and to adapt its DRX cycle to the one or more DRX cycles used by one or more of the further UEs.

10. The user device, UE, of claim 9, wherein
in case listening to one or more of the further UEs being in proximity of the UE yields multiple DRX durations, the UE is to enable multiple DRX cycles, or for enabling multiple DRX cycles, the UE is to create a new DRX pattern formed out of the multiple DRX cycles, or the new DRX cycle is the least common multiple of the multiple DRX cycles.

11. The user device, UE, of claim 1
wherein
the DRX synchronization source comprises a base station, the UE is to receive from the base station a control message, comprising the one or more DRX configurations, or the DRX synchronization source comprises one or more of the further UEs, the UE is to receive the one or more DRX configurations from a further UE using, any of a PC5 RRC signaling or a SCI for a given transmission.

12. The user device, UE, of claim 11, wherein the one or more DRX configurations comprise some or all of the following information:

a DRX cycle duration overall duration of a single DRX cycle, comprising the ON and OFF durations, an ON duration indicating the duration during which a UE may transmit and receive, an inactivity timer indicating the time duration a UE has to remain ON after the reception of a control signal and/or a transmission of a packet, a retransmission timer indicating the time duration a UE has to remain ON because a control signal has indicated a retransmission for a given packet a communication range requirement within which the UE is to expect or transmit feedback regarding a transmission transmitted or received.

13. The user device, UE, of claim 11, wherein, to operate in the DRX mode, responsive to receiving the one or more DRX configurations the UE is to activate the DRX mode.

14. The user device, UE, of claim 13, wherein the UE is to activate the DRX mode responsive to a lapse of the inactivity timer, or an explicit signaling, either directly or indirectly, by a further UE to activate or deactivate the DRX mode, or a HARO process being enabled, or a switch to a reception only mode, or a higher layer signaling to conserve power, or a change in QoS, or the UE being in a certain geographical location.

15. The user device, UE, of claim 14, wherein the explicit signaling by a further UE comprises:

the use of dedicated fields in a SCI pertaining to a given transmission, with information regarding a duration of a DRX activation or deactivation, the use of the "Resource reservation field" in the SCI to indicate the presence of further transmissions during which the UE is to remain ON in order to receive these transmissions, the use of the "Priority" field in the SCI to indicate the packet delay budget, PDB, associated to a transmission, during which the UE is to remain ON in order to receive any further retransmissions or HARO retransmissions.

16. The user device, UE, of claim 14, wherein, in case the UE is to activate the DRX mode responsive to a HARO process being enabled, when only NACK is enabled, the UE, when receiving data, is to stay ON until successfully receiving the transmission, or, when transmitting data, is to stay ON for a time duration for receiving the NACK, when both ACK and NACK are enabled, the UE, when receiving data, is to stay ON until successfully receiving the transmissions, or, when transmitting data, is to stay ON for a time duration for receiving the ACK or the NACK.

17. The user device, UE, of claim 16, wherein a time duration for a retransmission is defined by the UE activating a HARO timer when a HARO transmission is received and which defines a time window in which the UE is to expect a retransmission before going into the OFF mode or starting the inactivity timer, or extending the inactivity timer, so that the UE can finish a transmission within the ON duration, or the communication range requirement.

18. The user device, UE, of claim 11, wherein
the wireless communication system comprises a plurality of DRX configuration sources, the plurality of DRX configuration sources being ranked such that each of the DRX configuration sources comprises a rank different from the remaining DRX configuration sources, and in case the UE receives two or more DRX configurations with different start times and durations, the UE is to select the DRX configuration received from the DRX configuration source comprising the highest rank.

19. The user device, UE, of claim 18, wherein, responsive to selecting the DRX configuration from the DRX configuration source comprising the highest rank, the UE is to send assistance information to the one or more other DRX configuration sources so as to inform the other DRX configuration source about the presence of a DRX configuration sources comprising a higher rank, thereby enabling the other DRX configuration source UE to align its timing with the selected DRX configuration source.

20. The user device, UE, of claim 19, wherein the assistance information comprises information allowing to alter the characteristics of a DRX cycle.

21. The user device, UE of claim 20, wherein the characteristics of a DRX cycle comprises one or more of:

a duration of the DRX cycle length, an offset of the DRX cycle to match a start time, an ON duration of the DRX cycle.

22. A wireless communication system, comprising a plurality of user devices, UEs, of claim 1 and configured for a sidelink communication using, for example resources from a set of sidelink resources of the wireless communication system.

23. A method for operating a user device, UE, of a wireless communication system in a Discontinuous Reception, DRX, mode, the wireless communication system comprising a plurality of user devices, UEs, and the UE communicating with one or more further UEs using a sidelink, SL, the method comprising:
- receiving, by the UE, a DRX configuration from one of a plurality of DRX configuration sources,
- wherein the plurality of DRX configuration sources are ranked such that each of the DRX configuration sources among the plurality of DRX configuration sources comprises a rank different from each of the DRX configuration sources among the plurality of DRX configuration sources, and the UE is to select the DRX configuration from the DRX configuration source comprising the highest rank among the available DRX configuration sources.

* * * * *